(12) United States Patent
Shakes et al.

(10) Patent No.: US 9,524,485 B1
(45) Date of Patent: Dec. 20, 2016

(54) SYSTEM AND METHOD FOR PATTERN ASSIGNMENT FOR PATTERN-BASED ITEM IDENTIFICATION IN A MATERIALS HANDLING FACILITY

(75) Inventors: Jonathan J. Shakes, Mercer Island, WA (US); Donald L. Kaufman, Kirkland, WA (US); Eric Young, Mercer Island, WA (US); Nicholas M. Hanssens, Seattle, WA (US); Jennifer L. Cooper, Luxembourg (LU); Adam R. Baker, Southlake, TX (US)

(73) Assignee: Amazon Technologies, Inc., Reno, NV (US)

( * ) Notice: Subject to any disclaimer, the term of this patent is extended or adjusted under 35 U.S.C. 154(b) by 3524 days.

(21) Appl. No.: 11/364,156

(22) Filed: Feb. 28, 2006

Related U.S. Application Data

(63) Continuation-in-part of application No. 11/046,695, filed on Jan. 31, 2005.

(60) Provisional application No. 60/748,576, filed on Dec. 7, 2005.

(51) Int. Cl.
| | |
|---|---|
| *G06Q 10/00* | (2012.01) |
| *G06Q 10/08* | (2012.01) |
| *G06T 15/00* | (2011.01) |
| *G06Q 20/20* | (2012.01) |

(52) U.S. Cl.
CPC ............ *G06Q 10/087* (2013.01); *G06Q 10/08* (2013.01); *G06Q 20/203* (2013.01)

(58) Field of Classification Search
USPC .......................................................... 705/28
See application file for complete search history.

(56) References Cited

U.S. PATENT DOCUMENTS

| | | |
|---|---|---|
| 3,812,325 A | 5/1974 | Schmidt |
| 3,937,493 A | 2/1976 | Fasbender |
| 4,523,776 A | 6/1985 | Barber |
| 4,792,273 A | 12/1988 | Specht |
| 4,832,204 A | 5/1989 | Handy et al. |
| 5,834,706 A | 11/1998 | Christ |

(Continued)

OTHER PUBLICATIONS

U.S. Appl. No. 11/046,695, filed Jan. 31, 2005.

(Continued)

*Primary Examiner* — Garcia Ade
(74) *Attorney, Agent, or Firm* — Robert C. Kowert; Meyertons, Hood, Kivlin, Kowert & Goetzel, P.C.

(57) ABSTRACT

Pattern information may be associated with an item in an inventory to facilitate identification of the item from among other items in the inventory. The pattern information may represent a feature extrinsic to the physical appearance of the item and may be assigned to the item deterministically, randomly, or pseudo-randomly. An indicator of the pattern information, such as a tag or sticker, may be applied to the item or to its packaging to provide a visual aid to distinguish the item from other items in the same inventory or the item may be enclosed in additional packaging comprising an indicator of the assigned pattern information. Pattern information assigned to the item may comprise a single color, shape, pattern, or other attribute and may include other secondary pattern information. Different amounts of pattern information may be associated with different items or with the same item when co-located with other different items.

48 Claims, 16 Drawing Sheets

(56) References Cited

U.S. PATENT DOCUMENTS

| | | | |
|---|---|---|---|
| 6,026,378 A * | 2/2000 | Onozaki | G06Q 10/08 705/28 |
| 6,325,586 B1 | 12/2001 | Loy | |
| 6,343,276 B1 | 1/2002 | Barnett | |
| 6,377,867 B1 | 4/2002 | Bradley et al. | |
| 6,385,609 B1 * | 5/2002 | Barshefsky | H04Q 3/0087 |
| 6,587,835 B1 | 7/2003 | Treyz et al. | |
| 6,744,436 B1 * | 6/2004 | Chirieleison, Jr. | G06Q 10/087 345/419 |
| 6,801,245 B2 | 10/2004 | Shniberg et al. | |
| 2002/0077937 A1 * | 6/2002 | Lyons | G06Q 10/087 705/28 |
| 2003/0149526 A1 | 8/2003 | Zhou et al. | |
| 2003/0154135 A1 | 8/2003 | Covington et al. | |
| 2003/0154141 A1 * | 8/2003 | Capazario | G06Q 10/087 705/26.1 |
| 2003/0216969 A1 * | 11/2003 | Bauer | G06K 7/0008 705/22 |
| 2004/0010337 A1 | 1/2004 | Mountz | |
| 2004/0015415 A1 | 1/2004 | Cofino et al. | |
| 2004/0078299 A1 * | 4/2004 | Down-Logan | G06Q 30/0601 705/26.1 |
| 2004/0181467 A1 | 9/2004 | Raiyani et al. | |
| 2004/0243278 A1 | 12/2004 | Leishman | |
| 2005/0071234 A1 | 3/2005 | Schon | |
| 2005/0102203 A1 * | 5/2005 | Keong | G06Q 10/087 705/28 |
| 2005/0140498 A1 * | 6/2005 | Bastian | 340/5.92 |
| 2006/0144933 A1 * | 7/2006 | Do | G07G 1/0054 235/383 |
| 2007/0126578 A1 | 6/2007 | Broussard | |
| 2007/0150383 A1 | 6/2007 | Shakes et al. | |

OTHER PUBLICATIONS

PictureView, "Introdcuing the Next Generation of "Pick=to-Light" Automation," Dec. 24, 2004, 2 pages.

Vipcolor Technologies, "CIPColor VP202 Digital Color Barcode Label and Tag Printer for On-Demand-Color Printing of Labels and Tags," Dec. 9, 2004, 8 pages.

U.S. Appl. No. 10/864,291, filed Jun. 9, 2004.

Emedco, "Color-Coded Inventory Labels," Aug. 28, 2005, 2 pages.

Maverick Label.com, http://www.mavericklabel.com/products/convert-category_browse&product=41&category=2.php, Feb. 8, 2006, 2 pages.

Electromark: The Leading Source for Sign, Labels, Tags and Pole Marker for the Utility . . . , http://www.electromark.com/indexstock. asp, Jan. 13, 2006, 2 pages.

* cited by examiner

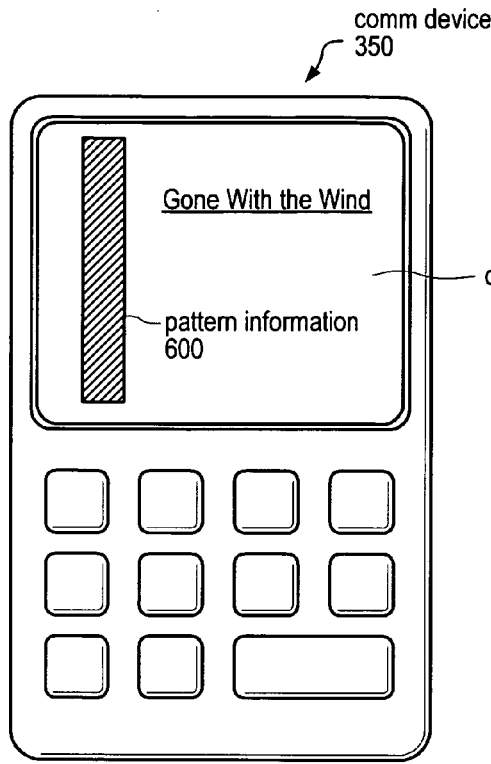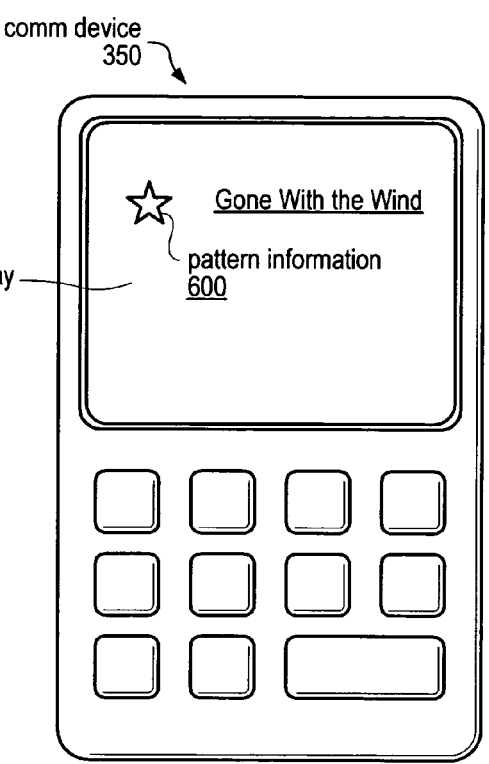
FIG. 8A  FIG. 8B
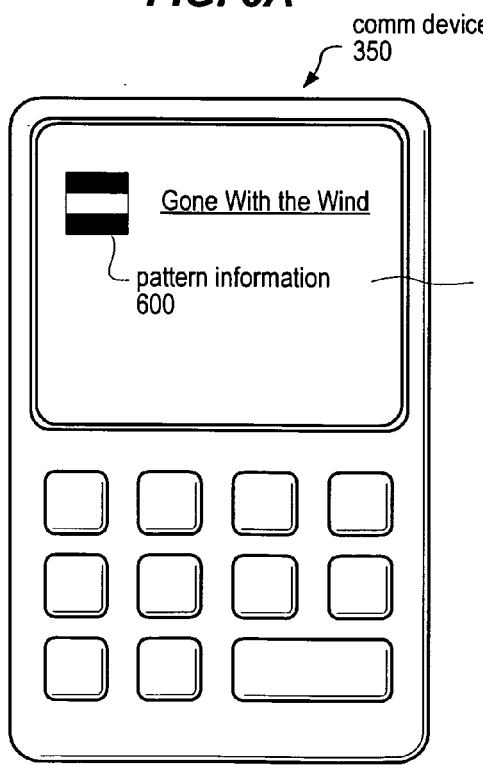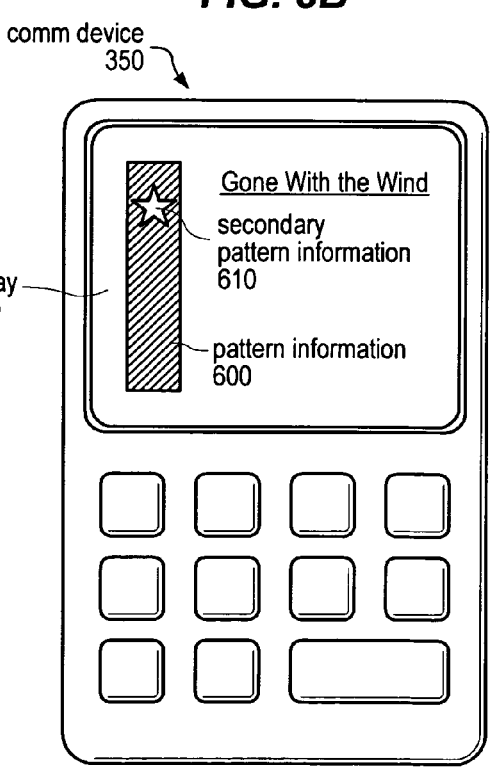
FIG. 8C  FIG. 8D

SYSTEM AND METHOD FOR PATTERN ASSIGNMENT FOR PATTERN-BASED ITEM IDENTIFICATION IN A MATERIALS HANDLING FACILITY

CONTINUING APPLICATION DATA

This application is a Continuation-In-Part of U.S. patent application Ser. No. 11/046,695 titled "System and Method for Pattern-Based Item Identification in a Materials Handling Facility," filed Jan. 31, 2005, whose inventors are Jonathan J. Shakes and Stefan Bayer, and which is herein incorporated by reference in its entirety. This application also claims priority to U.S. Provisional Patent Application Ser. No. 60/748,576 filed Dec. 7, 2005, and which is herein incorporated by reference in its entirety.

BACKGROUND OF THE INVENTION

Field of the Invention

This invention relates to materials handling systems such as order processing systems and, more particularly, to pattern-based item identification.

Description of the Related Art

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

The increasing scope of electronic commerce, fueled by the ubiquity of personal computers, the Internet, and the World Wide Web, has resulted in striking changes to the number of options open to customers to shop and pay for products. Virtual storefronts allow customers to view product information including features, specifications, appearance, pricing and availability from their own home or office. Such virtual storefronts have become commonplace even among wholesalers and retailers who may still maintain physical customer presences (i.e., brick-and-mortar storefronts). Additionally, many companies conduct business exclusively through virtual storefronts without maintaining any other form of customer presence, such as a physical storefront. Electronic commerce using virtual storefronts offers many advantages, such as lower cost overhead (e.g., due to lack of sales personnel, lack of physical storefronts, highly automated ordering processes, etc.), and a potential customer base limited only by the reach of the Internet.

When a customer places an order, one or several inventory items specified in the order must be retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, or other designation (including proprietary designations) may be stored together within inventory. In an inventory environment that includes a large number of many different items, it may be highly inefficient for a single employee to locate and pick every item for a given order. For example, the different items specified by a given order may be stored at mutually remote locations within the inventory facility, which would require a single picking agent to traverse a long path through the facility.

In order to make better use of inventory stocking space, it may be desirable to stock different items together in a single storage location or stocking area. While increasing the efficient use of inventory space, such co-location of different items may increase the difficulty, and thus the time, of identifying and picking a particular item. When picking items from inventory, the picking agent generally must examine any co-located items in order to determine the specific item to pick. This can be time consuming in situations where numerous similar items are stored together.

Additionally, several similarly titled or described items may be stored in a single inventory area, increasing the difficulty of identifying any particular item. For instance, if several CDs are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as DVDs, stored together. A picking agent may have difficulty identifying particular DVDs from among multiple DVDs in a single inventory. Again, any extra time required to correctly identify a DVD becomes significant, since each DVD may be stored and picked many times, as it is rented and returned.

SUMMARY

Various embodiments of a method and system for assigning pattern information may be used with pattern-based item identification in a materials handling facility. According to some embodiments, pattern information that generally approximates a view of a particular item may be presented to aid in the identification of the item in inventory. The pattern information may be extrinsic to the physical appearance of the item, and may be assigned to the item according to a product identification code, a date code, or some other attribute of the item unrelated to its appearance. In such embodiments, an indicator of the pattern information may be applied to the item to facilitate identification. Such an indicator may represent an easily identifiable color, shape, pattern, texture, or symbol applied to the item or its packaging. The indicator may be applied directly to the item or may be applied by attaching a wrapper, sticker, tag, or label to the item or its packaging, according to various embodiments.

Pattern information may be assigned to each item manually by an agent, in some embodiments, and may be assigned according to various guidelines, randomly, or by consulting a database or other information store containing pattern information corresponding to items in the order fulfillment center. In other embodiments, pattern information may be assigned to each item automatically using hardware or software configured to scan the item or a product identification code of the item and determine the pattern information. Scanning an item may be done automatically by hardware during receiving, by an agent using a scanning device, by an agent entering a product identification code into a control system through an input/output device, or using various other methods. Pattern information assigned to each item may be associated with the item and stored in a database, along with the item's product identification code, and may be used with pattern-based item identification, in some embodiments.

In some embodiments, multiple, different product items may be stored together in a single inventory area, such as a shelf, rack, bin, or drawer. Items may be stored in inventory areas by an agent, either randomly or according to various guidelines, or an inventory area may be selected for each item automatically, such as by software executing on a control system, in some embodiments. An agent or the control system may record the selected inventory area for each stored item in a product database, which may include a description, inventory location number, or other data representing the location of each item, indexed by a product identification code, for example. A picking agent may be provided instructions to locate and obtain a particular item from an inventory area. In some embodiments, the picking agent may utilize a communication device configured to present picking instructions, including the location of the inventory area in which the item is stored, and pattern information. The presented pattern information may approximate the view of the item visible to the picking agent, or of an indicator applied to the item, and may provide a visual indicator to distinguish the item from other items in the same inventory area, in some embodiments.

For example, in one embodiment, a picking agent may use a portable, handheld communication device configured to present instructions for locating a book from a particular inventory area, such as a shelf of books. The particular shelf may store different books in different formats by different authors. The picking agent may not be familiar with the particular item to be picked, and thus may not have any idea regarding the size, shape or color of the item. In one embodiment, the communication device may present pattern information approximating a view of the item visible to the picking agent at the inventory area. For example, the presented pattern information may approximate the view of the spine of the book or may approximate the size and shape of the view of the item. In another example, a picking agent may receive instructions for locating a DVD from a particular inventory area, such as a shelf of multiple, different DVDs. In one embodiment, a communication device may present pattern information indicating; approximating, describing, or representing a color, a shape, texture and/or other pattern information representing an indicator applied to the DVD packaging and visible to the picking agent at the inventory area. For example, the presented pattern information may indicate the color of a clamshell-style case enclosing the DVD or may represent a colored sticker applied to an item or its packaging. In yet another embodiment, the presented pattern information may approximate the view of a tag attached to the item. An indicator may also include a printed shape or a printed sequence of contrasting shapes, such as contrasting color bars, circles, or squares, in some embodiments. Using the presented pattern information, the picking agent may be able to quickly distinguish an item, such as a book, DVD, music CD, a software CD, or another item to be picked, from among other similar-looking items in the inventory area. According to some embodiments, the presented pattern information may only be a single rectangle indicating the color of the item or of an applied indicator, which may be enough to allow the picking agent to quickly identify and pick the correct item.

In some embodiments, the pattern information may also include secondary pattern information to further distinguish between otherwise similar items. Secondary pattern information may include other information such as secondary color patterning, perhaps representing artwork on the item's packaging, or perhaps the color of text on the item or the item's packaging, in some embodiments. In other embodiments, secondary pattern information may correspond to a second indicator applied to the item or its packaging, or may be additional information regarding a single indicator applied to the item or its packaging. For example, a DVD may be enclosed in a blue clamshell-style case and also have a sticker printed with a star shape attached to the case. In another example, a software CD case may have a tag attached that is printed with a blue star. In some embodiments, presented pattern information for these examples may include graphics representing "blue" and "star". In one embodiment, initial pattern information representing a star may be presented to a picking agent and secondary pattern information may be presented representing blue. In other embodiments, "blue" may be presented as initial pattern information and "star" may be presented as secondary pattern information.

While the pattern information may be presented graphically, in some embodiments, the pattern information may be presented textually. For example, a communication device may display the word "orange" to indicate that the item to be picked is generally or predominately orange in color. In another embodiment, the word "orange" may be displayed to indicate that an item is enclosed in orange packaging, such as if a CD or DVD is packaged in an orange clamshell-style case. Additionally, in some embodiments, two or more colors representing dominant colors of the visible view of the object may be displayed textually. For instance, if the spine of a book is mostly blue, but with some white artwork, "blue/white" may be displayed. In some embodiments, textual pattern information may be displayed in the relevant colors. For instance in the above example, the word "blue" may be displayed in a blue color and the word "white" may be displayed in a white color. In some embodiments, textual information may be displayed to describe an indicator applied to the item. For example, if a sticker or tag printed with a star is applied to an item, the word "star" may be displayed. In another example, textual information may be displayed to describe the form of the indicator, such as "sticker", "star tag", or "red case", according to some embodiments. In another embodiment, pattern information describing a sequence of contrasting shapes, such as contrasting color bars or circles may be presented textually, such as "blue red blue" or "white white black". In yet another embodiment, the pattern information may be presented in an auditory fashion, through voice recordings, or via a text-to-speech mechanism.

As described above, pattern information for items in inventory may be stored in a central database or other repository of product information, according to some embodiments. For example, a computer-based control system may load the pattern information from the central database and send it to a picking agent's communication device. In some embodiments, such a control system may be configured to determine the amount of pattern information to be presented for the picking agent.

Pattern information may also be used to increase both the ease and efficiency of sorting, packing, or quality assurance procedures. For example, when manually sorting items for multiple orders into single order groups, pattern information may aid the sorters to identify the items for a particular order. Additionally, when all the items for a particular order have been grouped together, packing or quality assurance personnel may utilize presented pattern information to quickly verify that every item for the order is present.

Pattern-based item identification may be used in a facility handling items for a rental service, in some embodiments. Any tasks associated with determining and associating pattern information, or with applying one or more pattern information indicators to an item, may only need to be performed once, whereas the storing, picking, sorting, packing, and shipping of each item, which may be made more efficient through the use of pattern-based identification, may be repeated many times for each item as the item is repeatedly rented and returned.

BRIEF DESCRIPTION OF THE DRAWINGS

FIGS. 8A through 8D illustrate exemplary communication devices presenting various types of pattern information associated with similar items, according to different embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
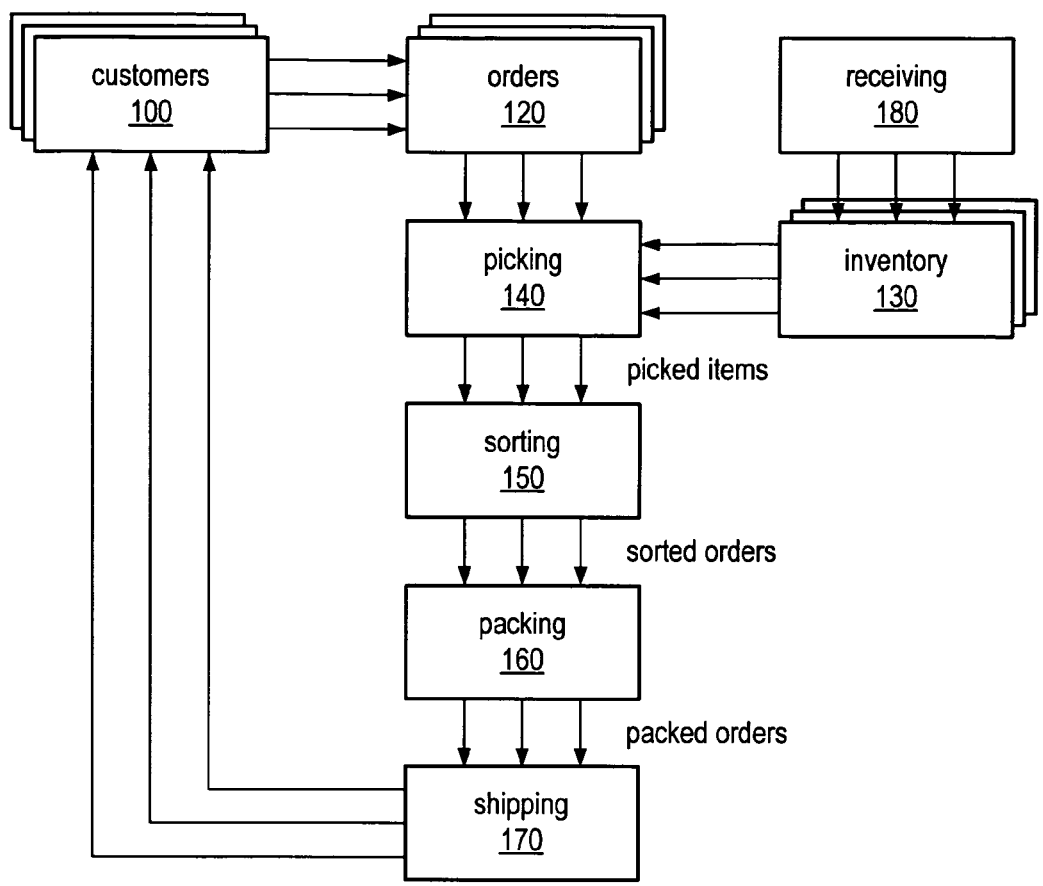
FIG. 1 illustrates a broad view of the operation of an order fulfillment facility, in one embodiment.

FIG. 1 illustrates a broad, exemplary view of a materials handling facility, which, in one embodiment, may be an order fulfillment facility configured to utilize pattern-based item identification as described herein. Multiple customers 100 may submit orders 120 to the distributor, where each order 120 specifies one or more items from inventory 130 to be shipped to the customer that submitted the order. To fulfill the customer orders 120, the one or more items specified in each order may be retrieved or "picked" from inventory 130 (which may also be referred to as stock storage) in the order fulfillment facility, as indicated by block 140. In some embodiments, items may be identified from inventory based on presented pattern information as described herein. Picked items may be delivered to one or more stations in the order fulfillment facility for sorting 150 into their respective orders, packing 160, and finally shipping 170 to the customers 100. Pattern based item identification as described herein may, in some embodiments, be utilized as part of picking 140, sorting 150, packing 160, or shipping 170. Note that a picked, packed and shipped order does not necessarily include all of the items ordered by the customer; a shipped order may include only a subset of the ordered items available to ship at one time from one inventory-storing location. Also note that an order fulfillment facility typically also includes a receiving operation 180 for receiving shipments of stock from various vendors and placing the received stock into stock storage. In some embodiments, an order fulfillment center may receive an order for an item not currently in the center's inventory. When the item is received, the order may then be filled and shipped. When an order is received for an item before the item has been received at an order fulfillment center, the received item may or may not be stocked into inventory before being matched up with the order and shipped out, depending upon the implementations of different embodiments. The receipt of the item at the facility may trigger the fulfillment process for a pending order. In some embodiment, pattern-based item identification may facilitate the selection of such items from a receiving area of an order fulfillment center. Also note that the various operations of an order fulfillment facility may be located in one building or facility, or alternatively may be spread or subdivided across two or more buildings or facilities.

Pattern-based item identification as described herein in various embodiments, may be utilized in several areas of a materials handling or order fulfillment facility such as during picking 140, sorting 150, packing 160, and shipping 170. For example, in some embodiments, fulfillment center personnel, sometimes called agents, who retrieve ordered items from inventory 130, may use pattern information to more efficiently identify specific items in inventory 130. Sorting agents, who sort items collected by picking agents, may utilize pattern-based item identification to speed the process of grouping items by order, and pattern information may additionally aid packing agents to efficiently ensure that the correct items are packed together for shipment, according to various embodiments. In another embodiment, pattern-based item identification may be used at the output chute of an automated sorter. For instance, an automated sorting machine may sort picked items into groups based on respective orders and presented pattern information may be used to locate a particular item from an order or to determine whether all item for a particular order are present. In yet another embodiment, pattern-based item identification may be used in a receiving station of a materials handling facility. For example, receiving personnel may have to sort through a delivery of mixed items and pattern information may be presented to enable them to easily identify the items in the shipment. Pattern-based item identification as described herein may also be utilized in a number of different facilities and situations, including, but not limited to material handling facilities, order fulfillment centers, rental centers, distribution centers, packaging facilities, shipping facilities, libraries, museums, warehouse storage facilities, etc. In general, pattern-based item identification may be used in any situation where one item must be identified from among other different items.

Please note that the arrangement and order of operations illustrated by FIG. 1 is merely one example of many possible embodiments of the operation of an order fulfillment facility utilizing pattern-based item identification. Other types of materials handling, manufacturing, or order fulfillment facilities may include different, fewer, or additional operations and resources, according to different embodiments.

Figure 2:
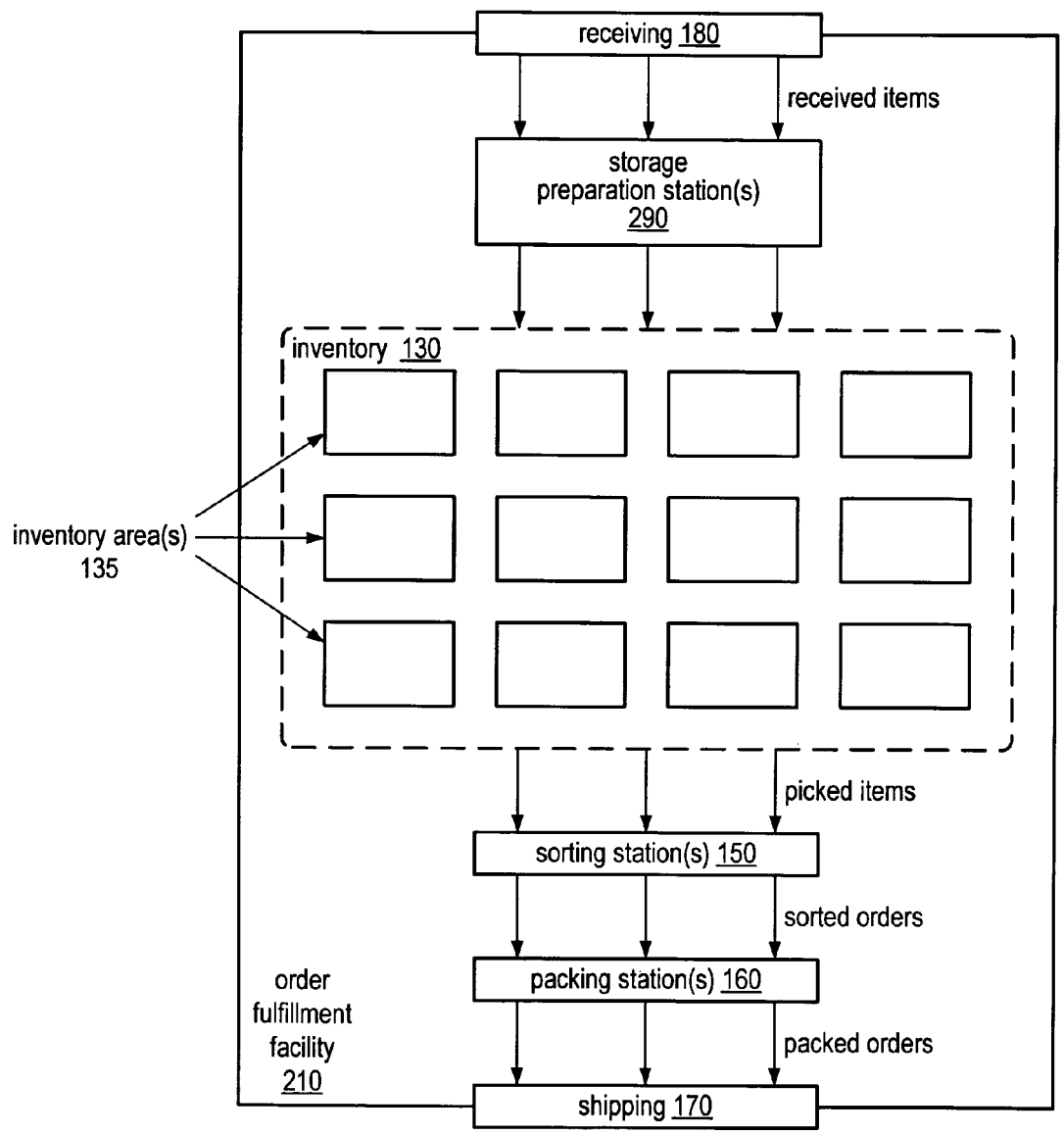
FIG. 2 illustrates one embodiment of an exemplary physical layout of an order fulfillment facility.

FIG. 2 illustrates a physical layout for an exemplary order fulfillment facility 210, according to one embodiment. At any time, one or more agents may each be picking items from inventory 130 to fulfill portions or all of one or more orders. According to some embodiments, the agents picking items from inventory 130 may utilize pattern-based item identification to increase speed and efficiency when identifying items from among different items that may be co-located in a single inventory area 135. According to some embodiments, each picking agent may be provided with picking instructions directing them to locate and obtain one or more items from inventory 130.

As described above, many fulfillment facilities store different copies of items in different individual inventory areas 135 within inventory 130. Storing copies of items in multiple inventory areas 135 may shorten the distance, and therefore the time, required to obtain an item from inventory, in some embodiments. Additionally, different items may be stored in a single inventory area 135, according to certain embodiments. Storing different items together may result in more efficient use of total inventory space than using a single inventory area for a multiple copies of a single item or product. It still may be beneficial in some embodiment to store similar items together to make better use of inventory space. For example, storing different books together on a single inventory shelf may use the available inventory space more efficiently than storing one book among other items of greatly differing size and shape, such electronic devices, clothing, or other items. Thus, in some embodiments, a fulfillment facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items. In certain embodiments, items may be randomly stored together in inventory areas. Such random storage may increase storage efficiency and may in some cases increase the likelihood that any individual item may be easily distinguished from the other items with which it is stored: Random storage of items may also decrease the amount of time needed to store individual items into inventory. For example, using random or pseudo-random storage may obviate the need for a time consuming, facility-wide, sort process for each item being stocked, which is frequently required by systems that store a single item per inventory location. Furthermore, storing items randomly, or in multiple different areas with other items, may also decrease the distance traveled to store each item by an inventory stocking agent. A control system for the facility may track where each item is stowed. In some embodiments, items may be stored together based on their distinguishability from each other. In some embodiments, determining where to store an item may be performed manually, while in other embodiments, it may be an automatic process performed by one or more computer software programs based on the pattern information associated with the individual items.

When obtaining a particular item from an inventory area storing different items, picking agents may have to carefully examine each item in the inventory area to properly identify the specific item to be picked. For example, if a picking agent is instructed to obtain a single copy of a book that is stored among other different books, the agent may have to read the title of each book in turn to identify the specific book to pick. The time required to read multiple book, CD, or DVD titles, when multiplied over the hundreds or thousands of items that a picking agent may have to identify in a single day, may add up to quite significant additional time in some embodiments. The extra time required to identify a specific item may be increased even more if the items stored together are very similar. For example, it may take a picking agent additional time to distinguish from among multiple, different CDs all of whose titles include "Greatest Hits." For example, in one embodiment, a picking agent may be instructed to obtain a copy of "Bach's Greatest Hits" on CD, from an inventory area also storing other CD's, one or more of which may also include "Greatest Hits" in their titles. When using pattern-based item identification, rather than carefully reading the title of each CD in the inventory area until the correct one is encountered, a picking agent may consult presented pattern information corresponding to a view of the item to be picked, according to some embodiments.

In some embodiments, the presented pattern information may be a scanned or photographic image of a view of an item. In other embodiments, the presented pattern information may be a color and/or shape pattern based on a view of an item, rather than a scanned or photographic image. In yet other embodiments, both image and non-image pattern information may be presented. In general, the term pattern information, as used herein, may refer to scanned, photographic image information or non-image-based pattern information, or both, according to various embodiments.

In some embodiments, assigned pattern information may not be related to the physical appearance of the item to be picked. In such embodiments, presented pattern information may represent an indicator applied to the item or its packaging. In one embodiment, for example, presented pattern information may correspond to a color of a package or wrapper enclosing an item. In another embodiment, presented pattern information may represent a shape or other pattern printed on a sticker or tag applied to an item or its packaging. Presented pattern information may include a sequence of contrasting black and white or colored shapes corresponding to shapes printed on a sticker or tag and applied to an item or its packaging, according to yet another embodiment. In still other embodiments, a textual representation of pattern information may be presented alone or in combination with other presented pattern information. In some embodiments, presented pattern information may represent a color, pattern, sticker, label, or tag applied to a shelf, box, bin, basket, or other container in the inventory area in which the item is stored.

Different versions or formats of the same product, such as multiple books of a single series, may be stored together, perhaps increasing the time necessary to properly identify any specific format or version. Additionally, a fulfillment center may distribute items in several different languages and distinguishing among such items may take increased time. For example, it may take a picking agent significantly longer to identify a particular book in a language not native to the picking agent if other books in the same inventory area also use the same foreign language. However, the same picking agent may be able to quickly and efficiently identify the same foreign language book based upon presented pattern information that provides a visual reference distinguishing that book from the other stored along with it, according to some embodiments.

The pattern information may be presented on a suitably equipped computer device, as will be described below, or may also be printed out in a printed "pick list" of items to be obtained from inventory, or in general provided to the picking agent in any of a number of suitable formats, according to various embodiments. For example, in one embodiment pattern information may be displayed graphically (or textually) on a graphical display or monitor of a suitable computer device. In another embodiment pattern information may by presented auditorily using speakers of a suitable computer device. In yet another embodiment, pattern information may be presented graphically, textually, and auditorily.

After obtaining items from inventory 130, agents may transfer those items to sorting stations 150, according to one embodiment. Please note, that not every fulfillment facility may include both sorting and packing stations. In certain embodiments agents may transfer picked items directly to a packing station, such as packing station 160, while in other embodiments, agents may transfer picked items to a combination sorting and packing station (not illustrated).

This may result in a stream and/or batches of picked items for multiple incomplete or complete orders being delivered to a sorting station 150 for sorting into their respective orders for packing 160 and shipping 170, according to one embodiment illustrated by FIG. 2. Note that portions of an order may be received at different times, so sorting 150 and packing 160 may have to wait for one or more items for some orders to be delivered to the sorting station(s) 150 before completion of processing of the orders. The stream or batches of incoming picked items are sorted into their respective orders at the sorting station(s) 150.

In some embodiments, pattern information may aid in sorting items at one or more sorting stations 150. For example, sorting agents may identify the different items for a particular order from among the other items at the sorting station based on presented pattern information corresponding to the particular item to be sorted. While, in some embodiments, automated sorting may be utilized, such as through the use of Crisplant® or Eurosort® sorters, in other embodiments sorting may be performed manually. In yet other embodiments, both manual and automatic sorting may be used in combination. In general, however, pattern-based item identification may aid the manual sorting of items, in certain embodiments. Sorting may include an intake operation and an output operation. An intake operation may include picking an item and identifying it. An output operation may include putting the item into an appropriate location, at which point sort is complete. A first type of intake operation may occur from a location containing a single type of item or a location chosen at random by the sorter. A second type of intake operation may occur from among multiple different items, with the sorter instructed to intake a specific item. A first type of the output operation may put the item to a single location, and a second type of the output operation may require the sorter to select a location to put the item from among multiple locations. Note that sorting only occurs when the second type of intake operation and/or the second type of output operation is performed. A combination of the first type of intake operation and the first type of output operation is simply a move of the item from one location to another, not a sort. Pattern-based item identification may facilitate sorting situations involving the second type of intake operation where pattern information may be used to facilitate selection of a specific item from among multiple different items. There may be no need to employ pattern information for sorts using the first type of intake operation since item selection is trivial.

Once an order is completed at a sorting station 150, the order may be ready to proceed to a packing station 160 to be packaged for shipping 170. Pattern information may also aid in the packing process as well, in some embodiments. For example, in one embodiment, a packing agent may use presented pattern information for each item of an order when identifying items for packing. This may involve the second type of intake operation discussed above where the agent selects an item from among multiple different items to be put in a particular package. Pattern information may be employed to aid in selecting the correct item. In some embodiments, a packaging agent may also perform the second type of output operation discussed above where the agent selects from among different types of packages for a location to put an item. Pattern information may be used to aid in selecting the correct package type. In another embodiment, quality assurance personnel may use presented pattern information to verify that the correct items are in a package before that package is shipped.

An order fulfillment facility such as an order fulfillment center 210 may implement an order fulfillment control system, or control system for short. A control system (such as illustrated in FIGS. 4 and 5A through 5D, discussed below) may include hardware and software configured for assisting and/or directing agents in the order fulfillment center 210 in fulfilling customers' orders. Items in inventory 130 may be marked or tagged with a bar-code, radio frequency identification (RFID) tag, Universal Product Code (UPC), Stock-Keeping Unit (SKU) code, serial number, and/or other designation (including proprietary designations) to facilitate order fulfillment center 210 operations, including, but not limited to, picking 140, sorting 150 and packing 160. These designations, or codes, may identify items by type, and/or may identify individual items within a type of item. The control system may include, or may be used in conjunction with, hand-held, mobile and/or fixed scanners or scanning devices that may be able to scan the marks or tags on individual items to determine and record the item and/or item type of the items. In some embodiments, a control system may be configured to access pattern information for items and may provide pattern information to picking agents along with other information indicating items to be obtained from inventory, as will be described in more detail below.

Note that an order fulfillment center may also include one or more receiving stations 180 for receiving shipments of stock from various vendors. The received stock may then be placed into stock storage in one or more inventory areas 135 of inventory 130, in one embodiment. During receiving, pattern information may be assigned and associated with each received item, according to one embodiment. As described above, pattern information may be assigned manually by an agent, in some embodiments, or may be assigned automatically using hardware or software configured determine the pattern information. The assigned pattern information may be stored in a product database with a product identification code or other item or product information, in some embodiments. According to certain embodiments, the pattern information may be available to control system devices, communication devices, or other computer devices, as described below.

In some embodiments, items may be stored in inventory using colored wrappers, boxes or other containers. Thus, in one embodiment, items that may not be easily distinguishable by their own packaging may be "prepped" for use with pattern-based item identification by putting different items into differently shaped, colored, textured or patterned, packages or containers, such as clamshell-style cases, wrappers, boxes, crates, cartons, bags, etc. In other embodiments, differently patterned identifiers or indicators, such as tags or stickers may be attached (either temporarily or more permanently) to different items to aid in pattern-based item identification.

In one embodiment, a fulfillment center configured to fulfill orders may include a plurality of receiving stations configured to receive items for storage, a plurality of storage preparation stations configured to apply indicators of assigned pattern information to the items, a plurality of inventory areas configured to store the received items, and a plurality of packing stations configured to package items selected from the inventory areas. Not every fulfillment center may include both receiving and storage preparation stations. In certain embodiments, agents may both receive items and prep items for storage at a combination receiving and preparation station before transferring the items to one or more inventory areas.

An agent may traverse the fulfillment center and may select each item from one or more of the inventory areas and may use pattern information associated with each item to identify that item from among other co-located items.

Figure 3A:
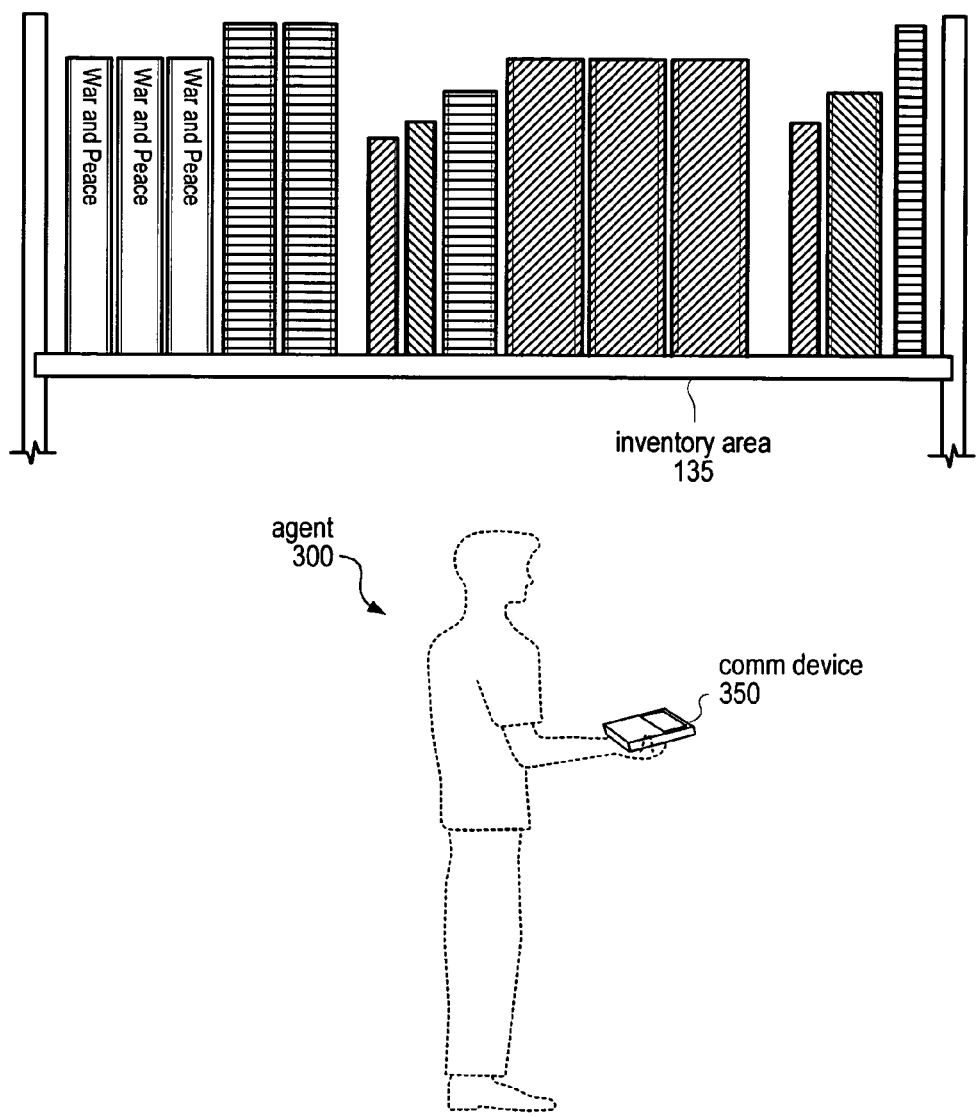
FIG. 3A illustrates a picking agent using a communication device to identify an item at an inventory area, according to one embodiment.

FIG. 3A illustrates a picking agent using a communication device to identify an item at a single shelf inventory area, according to one embodiment. Picking agents may, in some embodiments, receive and view picking instructions and pattern information via a communication device, such as communication device 350. In one embodiment, communication device 350 may receive the pattern information to present from a control system controlling the filling of orders, as will be described below regarding FIG. 5A.

When picking an item from an inventory area, the agent may have to distinguish the particular item from among other different items in the same inventory area. For example, an agent 300 may be instructed to pick a copy of *War and Peace* by Leo Tolstoy from inventory area 135, according to one embodiment. In some embodiments different items may be stored together, as illustrated by inventory area 135 in FIG. 3A. For example, a single inventory storage area, such as inventory area 135 may store multiple copies of multiple items, such as the three copies of *War and Peace* stored together among the other books and items in inventory area 135, in FIG. 3A. In certain embodiments, inventory areas also store items in multiple rows, one behind the other. In one embodiment, an inventory area may be equipped and configured to automatically position, via any of a number of conveyance means (such as via springs, rollers, belts, slides, gravity, etc), an item at the front of the inventory area and to move a second item into the front position if the front item is removed from the inventory area. In other embodiments, inventory areas may be equipped with storage equipment configured to store items vertically as well as horizontally.

In some embodiments, the agent may be using a portable communication device, such as communication device 350, which presents instructions and pattern information regarding items to be picked. In a traditional order fulfillment facility, the agent may have to read the title of each book stored in the inventory area to determine the correct item to pick. When using pattern-based item identification as described herein, however, agent 300 may be able to use pattern information presented on communication device 350, or provided in another manner, to quickly identify the correct item to pick, according to some embodiments. For example, in one embodiment agent 300 may be instructed to obtain a copy of *War and Peace* that has a brown spine with white title text and communication device 350 may present pattern information indicating the brown and white coloring of the book spine. Pattern-based item identification may eliminate the need for an agent to use a title, description or any other text-based identification process to locate the correct item, in some embodiments. While, in certain embodiments, pattern-based item identification alone may not be sufficient to identify every inventory item, the time saved for the items that can be correctly located solely based on pattern information may more than make up for the few items for which text based comparison (e.g. of a title) is required. Additionally, in some embodiments, a picking agent may use pattern-based item identification to locate an item and may then use a scan-code reader to verify that the correct item was located. In one embodiment, communication device 350 may present pattern information approximating the appearance of the white text on the brown spine of the book. Thus, agent 300 may be able to quickly identify and select the correct book from among the other books also located in inventory area 135.

In one embodiment, communication device 350 may present the pattern information graphically. When presenting pattern information graphically, communication device 350 may present the pattern information on a display or monitor either a part of or coupled to communication device 350. For example, communication device 350 may present, or display, a tall thin brown rectangle with a smaller, thin rectangle inside it corresponding to the copy of *War and Peace*, described by way of example above. Pattern information may also be presented in such a way to approximate the shape and/or proportions of the item to be picked. For instance, if the item to be picked is a tall thin book, the pattern information may include a tall thin rectangle, while if the item is a short, thick book the presented rectangle may be proportionally shorter and thicker, according to various embodiments.

In another embodiment, communication device 350 may present the pattern information in a textual fashion. In the example presented above, communication device 350 may, in one embodiment, present "brown" or "brown/white" to represent the copy of *War and Peace* described above. In one embodiment, textual pattern information may be displayed graphically using the colors described in the text. For example, the word "brown" may be presented in a brown color. In another embodiment the pattern information may be presented textually using spoken voice, such as via text-to-speech technology. In some embodiments, the pattern information may be presented both textually and graphically. For example, communication device 350 may present a brown rectangle and also present the text, "brown," in one embodiment. In another embodiment, communication device 350 may present "rectangle" or "tall, thin rectangle," in a brown color.

In one embodiment, actual scanned images, rather than pattern information, of items to be picked may presented by communication device 350 and used by picking agents to identify items. However, using actual scanned images may require additional network and computer resources since the scanned images may be involve large amounts of data. In some embodiments, pattern information alone, as opposed to a photographic or scanned image, may be enough to identify an item without any actual images of the item.

Figure 3B:
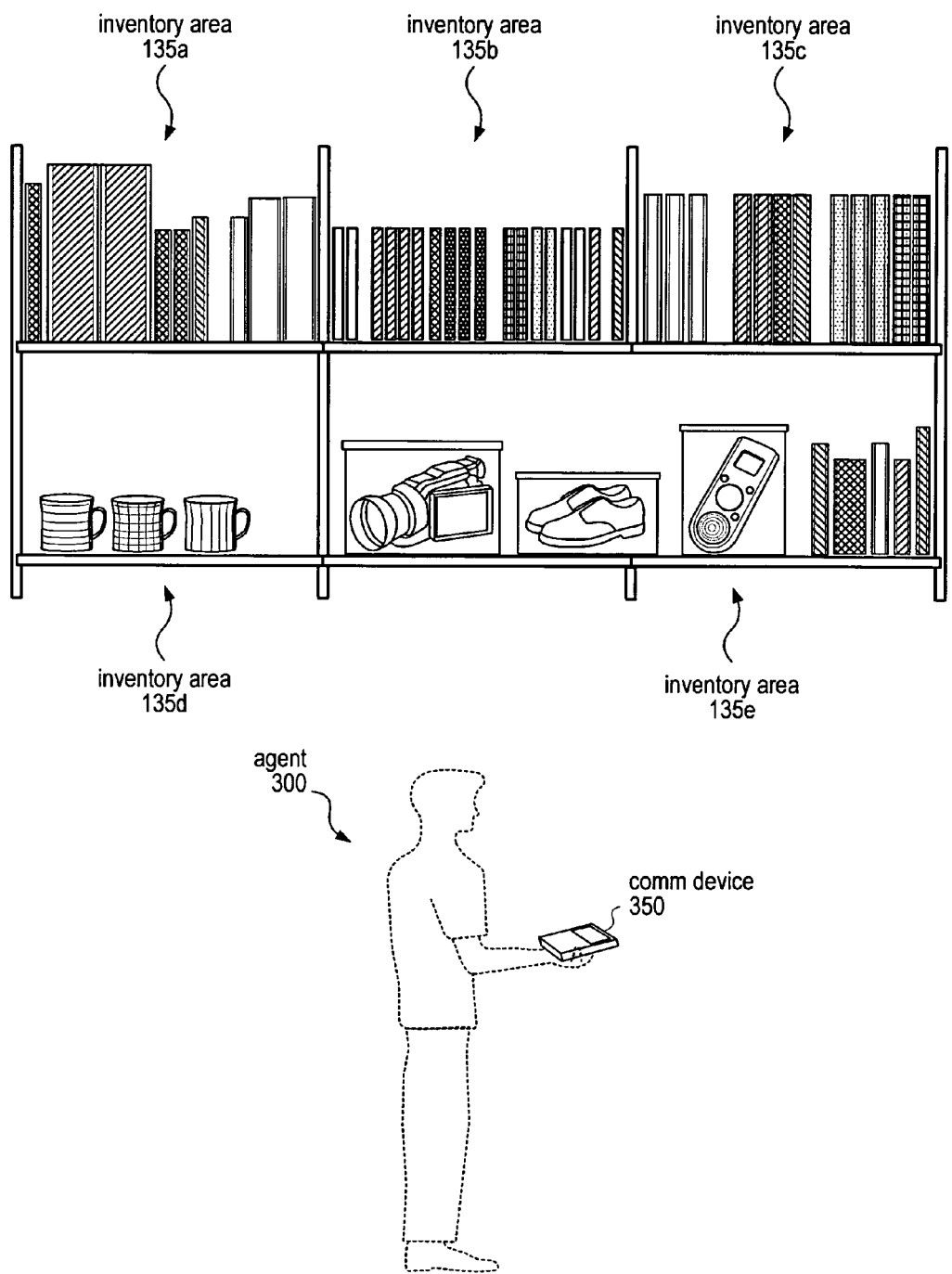
FIG. 3B illustrates a picking agent using pattern information to identify various items from a multi-shelf inventory area, according to one embodiment.

FIG. 3B illustrates a picking agent using pattern information to identify items at a multi-shelf inventory area, according to one embodiment. Pattern information may be used to identify different types of items, according to different embodiments. While mainly described herein regarding the identification of items such as books, CDs, and DVDs, pattern-based item identification may be utilized with generally any kind of item, according to various embodiments. For example, pattern-based item identification may allow for efficient identification of a particular coffee mug from among differently patterned coffee mugs, in one embodiment. In other embodiments, pattern-based item identification may allow for quick identification of one particular clock from among differently shaped and/or patterned clocks. In general, pattern information may aid in the identification of virtually any item stored with other different items and may be especially beneficial when used to identify an item from among other similar items.

For example, pattern-based item identification may aid in identifying a book from among several books, as illustrated in inventory area 135*a*, or in identifying a CD from among other CDs in inventory area 135*b*, or a DVD from inventory area 135*c*. Additionally, pattern-based item identification may be used with other items such as to identify a particular cup or mug, as in inventory area 135*d*. Pattern-based item identification may also be used to identify items from more dissimilar items such as those illustrated in inventory area 135*e*.

In some embodiments, pattern information may only be presented when required and pattern information may not be presented for an item that is already easily distinguishable from other items. For example, an agent instructed to pick a video camera from inventory area 135*e* may not require any pattern information since an item description (e.g. "video camera") may be enough to identify the correct item, in one embodiment. However, pattern information may be presented for another item in the same inventory area, according to one embodiment. For instance, pattern information may be presented to identify one of the books that are also in inventory area 135*e* or to distinguish one type of video camera from another, in different embodiments. In some embodiments, pattern information may be presented for certain items and not for others in the same inventory area, depending upon the similarity of any one item to the other items in the inventory area. Thus, in some embodiments, pattern information may be presented only if necessary. Only presenting pattern information when necessary may save network bandwidth or other computing resources, in certain embodiments.

Additionally, in some embodiments, the items stored among the various shelves of 135 may be sufficiently different that all the shelves together may be considered a single inventory area. In other embodiments, however, each individual shelf (or bin, drawer, etc) may be considered a single inventory area when using pattern-based item identification.

In some embodiments, different pattern information may be provided for a particular item based upon the particular inventory area in which it is stored. Since different copies of a particular item may be stored in separate inventory areas and since each of those inventory areas may store a different set of other items, the pattern information needed to distinguish one particular item from other items in the same inventory area may vary from inventory area to inventory area, according to one embodiment. For example, a book with a red spine may by the only red item in a particular inventory area, while a second inventory area may store the same red book and another red item, such as a CD or DVD. Thus, pattern information provided for the book in the first inventory area may only indicate the color red, since that may be enough for the agent to identify the correct book (since that is the only red item at that storage location). However, when picking the same red book from the second inventory area, pattern information may be provided that indicates the color red but that also indicates secondary pattern information for the red book, such as indicating white text on the spine, according to one embodiment.

In general, the amount and/or type of pattern information provided to identify an item may vary based on knowledge about the item, the item's location, other items co-located with the item, and/or heuristics or other rules regarding how much information may be required to identify the item, according to various embodiments. In some embodiments, a control system, such as control system 400, may be configured to programmatically adapt the amount or type of information provided based upon the results of prior pickings of the same item, similar items, or other items previously picked by the same picking agent. For instance, a particular item may be more difficult than others to distinguish and thus additional pattern information, such as secondary pattern information, may be supplied to help identify that item, in some embodiments. Additionally, in some embodiments, a particular agent may have difficulty distinguishing a particular item or type of item and control system 400 may adapt the amount and/or type of pattern information supplied to that particular agent when picking certain items. Thus, information regarding the results of previous pickings may be used to adapt the amount and/or type of pattern information provided for future pickings, according to various embodiments.

Figure 3C:
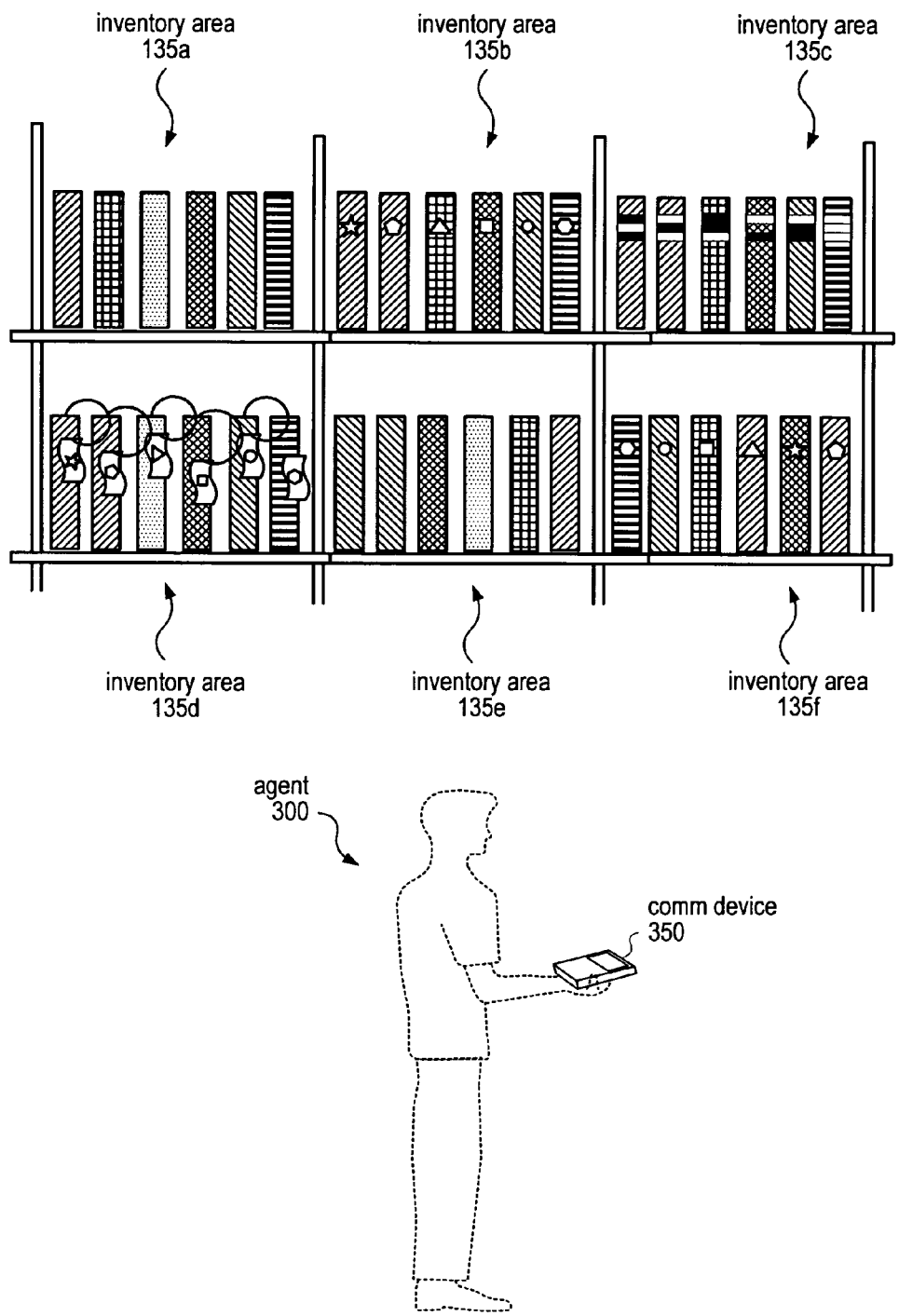
FIG. 3C illustrates a picking agent using pattern information to identify items from among similar items in a multi-shelf inventory area, according to various embodiments.

In some embodiments, a single inventory area may store multiple items of similar shape and size that may be difficult to distinguish from each other, such as DVDs, music CDs, software products, or other items. In such embodiments, the visible portion of the item may not include a dominant color or a distinctive label or logo. In order for a picking agent to more easily distinguish between the items, pattern information may be assigned to the items and a pattern information indicator applied to them when they are received. For example, FIG. 3C illustrates a picking agent using pattern information to identify similar-looking items, such as DVDs, stored at a multi-shelf inventory area, according to different embodiments. In one embodiment, for example, DVDs may be enclosed in differently colored clamshell-style cases according to their assigned pattern information. In other embodiments, a sticker printed with a pattern information indicator, such as a geometric shape or a sequence of black and white or contrasting color bars, may be applied to an item's packaging, such as to DVD, CD, or software packaging. In yet another embodiment, a tag printed with a pattern information indicator may be attached to an item's packaging. Although the example described in conjunction with FIG. 3C includes DVDs, CDs, and software products, the same techniques may be applied to any other types of items picked from an inventory area, such as books, toys, clothing, hardware, materials, etc.

Figure 4:
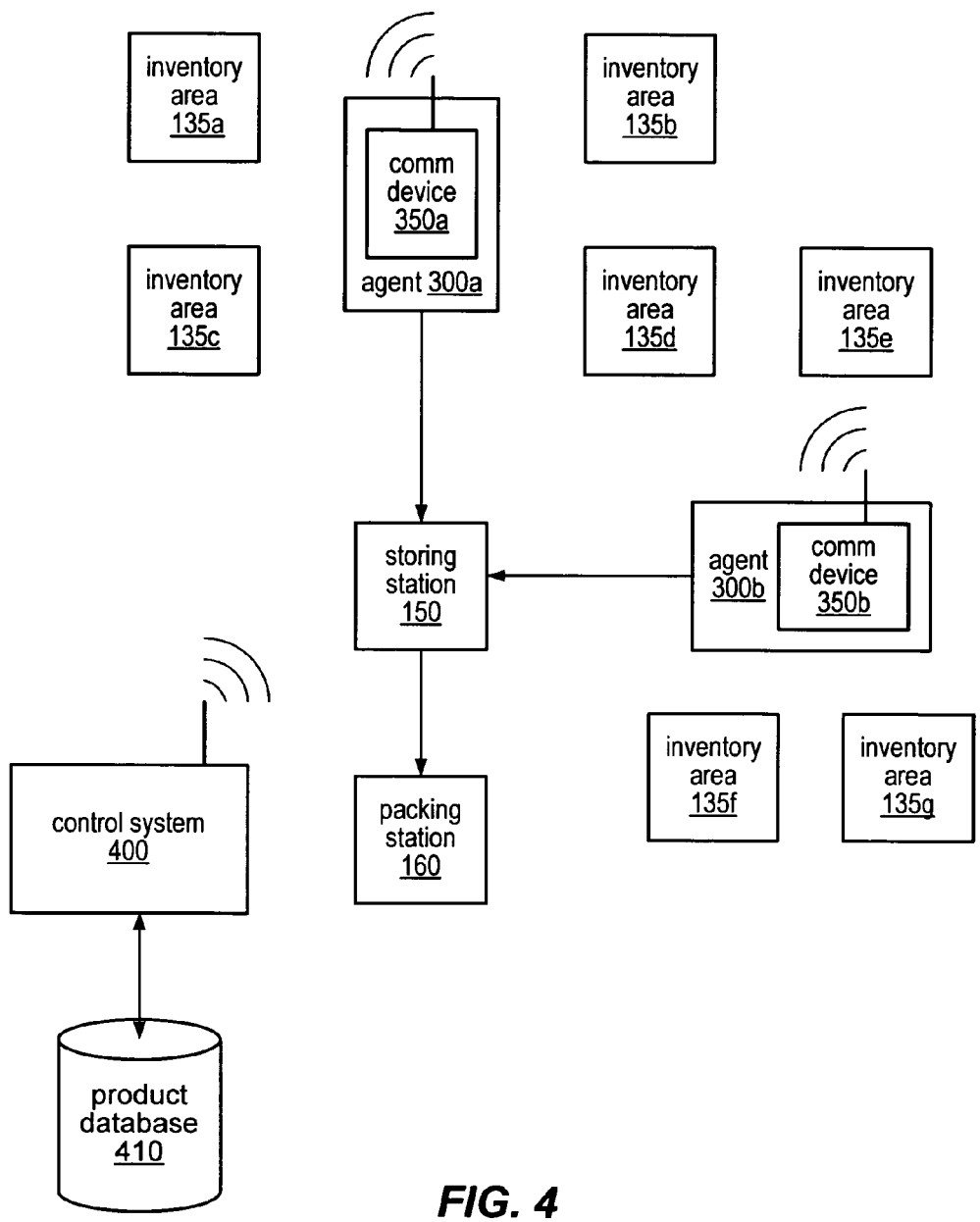
FIG. 4 is a block diagram illustrating multiple picking agents traversing a portion of a fulfillment center, according to one embodiment.

FIG. 4 is a block diagram illustrating exemplary paths of several agents through a portion of a fulfillment center, according to one embodiment. As described above, multiple pick agents may be picking items at the same time in an order fulfillment facility and no single agent may pick all the items for a single order. Instead, in some embodiments, each of several agents may pick one or more items for an order and transfer those items to a sorting station. Pattern information may be provided to each agent to aid in identifying items from other co-located items, in one embodiment. For instance, in some embodiments, items may be purposefully stocked in inventory areas such that items that are easily distinguished from each other are located in the same inventory area. In one embodiment, control system 400 may be configured to provide a picking agent, such as agent 300a or 300b, with picking instructions regarding one or more items to obtain from inventory. In some embodiments, control system 400 may also provide the picking agent with pattern information associated with an item to pick and the agent may identify the item based upon the pattern information. In other embodiments, picking agent may be provided with pattern information from a source other than via control system 400.

For instance, in some embodiments, agent 300a may carry a portable communication device 350a, configured to present picking instructions and pattern information received from control system 400. In such an embodiment, control system 400 may consult product database 410 to determine an inventory area from which agent 300a should retrieve the item and may also load pattern information for the item from product database 410. In other embodiments, pattern information may be stored separately from other item information. In yet other embodiments, control system 400 may load pattern information across a network from another device configured to store and provide pattern information. Communication device 350a may receive both the pick instructions and the pattern information from control system 400, in any of a number of different manners, according to different embodiments, as will be discussed in more detail below regarding FIGS. 5A through 5D. In some embodiments, control system 400 and communication device 350a may each be configured to communicate wirelessly, allowing picking agents to move freely around a fulfillment facility while receiving picking instructions and pattern information.

Communication devices 350 may, in some embodiments, be configured to communicate with control system 400, for example via radio communication, wireless networking, and/or a wired communication protocol, to convey instructions from control system 400 to agents 300 as to what actions to perform within the order fulfillment facility. Communication devices 350 may also include, but are not limited to, one or more of: handheld devices, devices worn by or attached to the agents, and devices integrated into or mounted on any mobile or fixed equipment of the order fulfillment facility such as push carts, bins, totes, racks, shelves, tables, and work benches, according to various embodiments. Communication devices 350 may further include, but are not limited to, one or more of: personal computer systems, desktop computers, rack-mounted computers, laptop or notebook computers, workstations, network computers, "dumb" terminals (computer terminals with little or no integrated processing ability), Personal Digital Assistants (PDAs) or other handheld devices, proprietary devices, printers, or any other devices suitable to communicate with control system 400. In general, a communication device 350 may be any device that can communicate with control system 400 and convey instructions to agents 300. In one embodiment, at least some of the communication devices 350 may be configured to scan or otherwise read or receive codes or identifiers of various components in the order fulfillment facility and to communicate the entered codes to control system 400 for use in directing agents 300 in the various operations of the control center. Such components may include, but are not limited to, one or more of items, orders, modular sorting stations, modular bins, and compartments of modular bins.

Figure 5A:
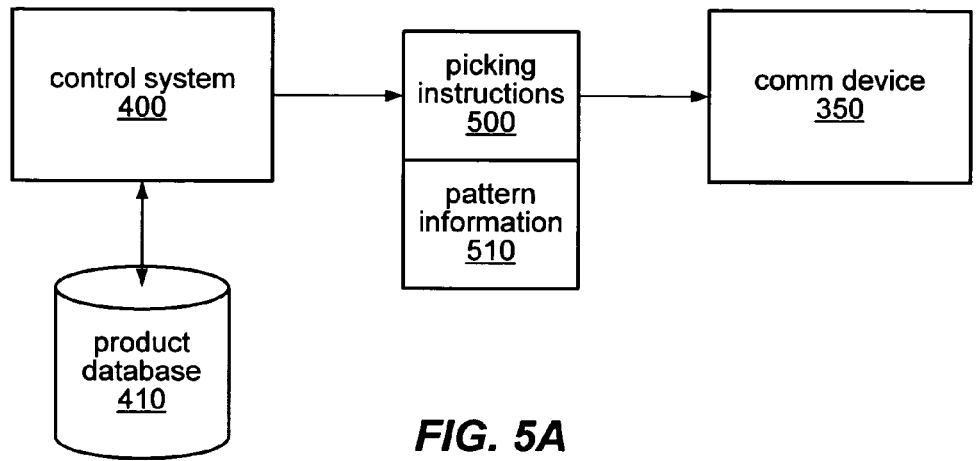
FIGS. 5A through 5D are block diagrams illustrating various embodiments of pattern information delivery from a control system to a communication device.

FIG. 5A is a block diagram illustrating one embodiment of pattern information delivery from a control system 400 to a communication device 350. Pattern information used as part of pattern-based item identification may be stored as part of a product database, such as product database 410, according to one embodiment. When instructing an agent to pick a particular item, control system 400 may, in some embodiments, be configured to access product database 410 and retrieve pattern information for the particular item to be picked. In some embodiments, control system 400 may send the pattern information along with the picking instructions directing the agent regarding which item to pick and where that item is located. Control system 400 may communicate with communication device 350 according to any of a number of different communication protocols, such as via TCP/IP, HTTP, 802.11, Bluetooth, etc. As illustrated in FIG. 5A, control system 400 may send a message including both picking instructions 500 and pattern information 510 to communication device 350, according to some embodiments. In one embodiment, control system 400 may send two separate messages, one for picking instructions 500 and one for pattern information 510. In another embodiment, control system 400 may save network resources by appending pattern information 510 to a message for sending picking instructions 500. In some embodiments, the number of bytes required to transmit pattern information 510 may be small enough, such as a single byte in certain embodiments, that attaching pattern information 510 to a message that is already being sent may be more efficient than the overhead required to send another message just for pattern information 510. For example, pattern information 510 may be small enough to insert into an unused field of an existing message, such as one used to send picking instructions 500, and may therefore be sent with no or almost no increase in required bandwidth, according to certain embodiments. In yet other embodiments, communication device 350 may store or cache received pattern information and may also be configured to locate and retrieve pattern information directly from product database 410, rather than relying upon control system 400 to provide it.

The actual amount of data needed to represent or identify the pattern information may vary from embodiment to embodiment. For example, in one embodiment, the pattern information may be represented by actual graphic images of the pattern information, while in other embodiments the pattern information may be encoded and may thus require less data storage to represent the same pattern information. For example, in one embodiment, a single byte may be able to encode the pattern information for most items. For instance, in one example, just a dominant color of the item to be picked, or of an applied pattern information indicator, may be enough to allow an agent to efficiently identify the item from among the other items with which it may be stored. Thus, in some embodiments, control system 400 may send only a single byte representing the color of the item or indicator as the pattern information to communication device 350.

In another example, different sets of bits in a byte may represent different aspects of the pattern information. One nibble may represent the general shape of the pattern information while another nibble may represent the color of the shape, where the shape and color may represent the item itself or may represent an applied pattern information indicator. Thus, in one embodiment, a single byte may be able to represent any combination of 16 different shapes and 16 different colors. In such an embodiment, 16 colors and shapes may be enough to distinguish any particular item from among the other items it may be stored with. Also in such an example, the facility may take care when stocking inventory to ensure that any individual inventory area only contains items that are distinguishable using 16 colors and shapes. In other embodiments, different and/or more complex encoding schemes may be used. In some embodiments, different encoding schemes may be utilized in a single facility. Thus, for certain items in certain inventory areas, a single byte may be used to encode and send the pattern information, while for other items in other inventory areas, two or more bytes may be used for the pattern information. In some embodiments, more than one set of pattern information may be associated with a single item, such as a detailed pattern, which may require more data, and a simpler pattern, perhaps requiring less data.

In some embodiments, control system 400 may send an actual graphic image of the pattern information to communication device 350. Transferring actual graphic images may, in some embodiments, allow the use of less powerful, or off-the-shelf, communication devices because presenting a graphic image may not require any analysis or interpretation or pattern information that may be needed to properly present encoded pattern information. When using actual graphic images, any of various common graphic formats may be used, such as Microsoft Windows bitmap (BMP), computer graphics metafile (CGM), graphic interchange format (GIF), PC Paintbrush format (PCX), JPEG file interchange format (JPEG), tagged image file format (TIFF), and/or many others.

In certain embodiments, textual representations of pattern information may be used and thus control system 400 may send a text string of the pattern information to communication device 350. In other embodiments, textual representations of pattern information may be determined by communication device 350 based on encoded pattern information. For example, a single byte may be used to represent the dominant color a visible view of the item to be picked, or of an applied pattern information indicator, and communication device 350 may both graphically and textually present the color of the item to be picked. In other embodiments, however, control system 400 may send both encoded pattern information and a text string for the pattern information. In certain embodiments, control system 400 may send a graphic image of the pattern information as well as a text string for the pattern.

In some embodiments, control system 400 may be configured to send the pattern information to communication device 350 when the agent has arrived at the proper inventory area. In such an embodiment, control system 400 may be configured to receive an indication, either from the agent through communication device 350, through an RFID device, or through some other proximity detection system, that the agent has reached the proper inventory area. In other embodiments, control system 400 may send pattern information when sending the initial picking instructions to communication device 350. Thus, in some embodiments, control system 400 may send pattern information to communication device 350 prior to the when the agent actually needs the information. Subsequently, when the agent is ready to identify an item, communication device 350 may already have pattern information for the item. For example, control system 400 may supply pattern information for multiple items at one time, such as for, multiple items located in a single inventory area, or located in multiple inventory areas in proximity to one another. In some embodiments, control system 400 may be configured to determine when an agent has entered a particular area or section of the inventory space and supply pattern information for all the items the agent is to identify in that area or section of inventory. In certain embodiments, providing pattern information prior to when it is actually needed by the agent may prevent the agent from having to wait for information to be received by communication device 350.

In other embodiments, communication device 350 may be configured to request the pattern information for the item to be picked. For instance, the agent may use a button or other user entry device connected to communication device 350 to signal that he/she has arrived at the proper inventory area and is thus ready for the pattern information. Alternatively, agents may only request pattern information if and when it is required. For instance, an agent may only request pattern information if he is having trouble identifying or locating the correct item to be picked. In other embodiments, communication device 350 may be connected to a proximity awareness system and may thus be configured to automatically request pattern information when the agent is approaching the proper inventory area. In such an embodiment, communication device 350, control system 400 and/or a proximity awareness system may be configured to coordinate such that an agent receives the pattern information when needed—thus preventing the agent from having to wait for the pattern information to be received and presented.

In some embodiments, communication device 350 may include sufficient resources to store pattern information for part or all of the items that may be picked. Thus, in such an embodiment, control system 400 may send pick instructions regarding an item to be picked and communication device 350 may be configured to access pattern information for that item from a local product database on communication device 350.

Figure 5B:
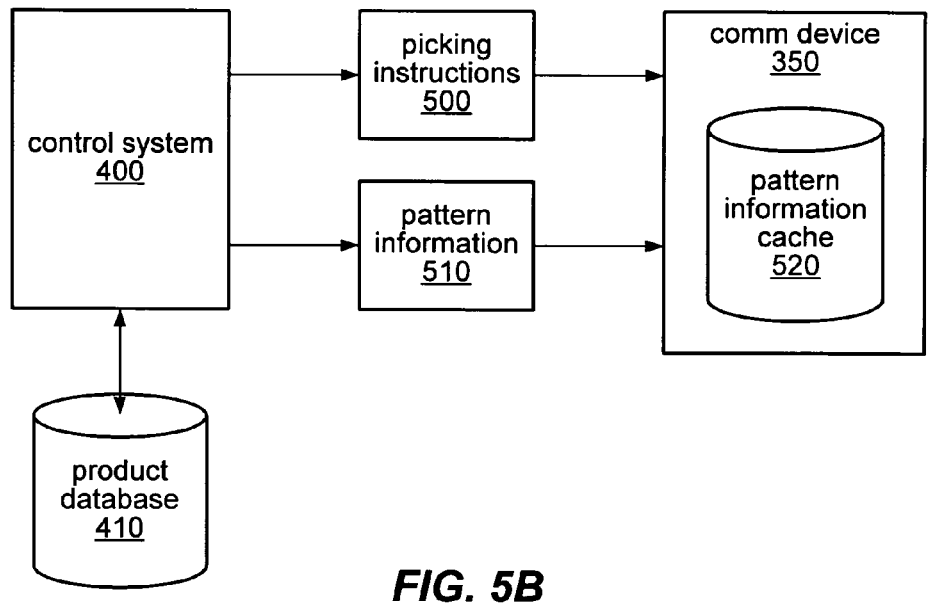

FIG. 5B illustrates one embodiment for transferring pattern information where communication device 350 may be configured to cache received pattern information for commonly picked items. For example, control system 400 may send picking instructions 500 regarding an item to be picked to communication device 350. Communication device 350 may be configured to determine whether or not pattern information for the item to be picked is currently stored in pattern information cache 520 on communication device 350. In some embodiments, communication device 350 may store cached pattern information on a storage medium, such as system memory, flash memory, or hard drive, of communication device 350. In other embodiments, however, communication device 350 may be configured to store cached pattern information on a separate device accessible, perhaps wirelessly, from communication device 350. In some embodiments, communication device 350 may be configured to request pattern information for any item to be picked for which it does not already have pattern information stored locally.

If communication device 350 determines that pattern information for an item does not currently exist in pattern information cache 520, communication device 350 may, in some embodiments, request pattern information for the item from control system 400 and in response, control system 400 may send pattern information 510 to communication device 350. Alternatively, if communication device 350 determines that pattern information cache 520 does contain pattern information for the particular item, communication device 350 may load, present, and/or otherwise use the cached pattern information as if it had been received from control system 400.

In some embodiments, communication device 350 may be configured to cache pattern information for only the most recently picked items. In such an embodiment, the number of recently picked items may be configurable, either by a system administrator or by an individual picking agent, or may be automatically managed by computer system 400 based upon available system resources. Thus, when a commonly picked item is next required, communication device 350 may already have the pattern information—thus saving additional time and network bandwidth. In certain embodiments, communication device 350 may be configured to cache pattern information only for items designated as commonly picked items. For instance, when sending pattern information for a commonly picked item, control system 400 may include in the message an indication that communication device 350 should cache pattern information for that item. In other embodiments, communication device 350 may be configured to recognize the fact that an item has been frequently picked and may also be configured to cache pattern information for that item automatically.

In embodiments where the amount of pattern information presented for a particular item may vary depending upon the other items stored together with the item, control system 400 may send an indication of the particular type or version of pattern information required for any particular picking of that item. Thus, in such embodiments, communication device 350 may cache different versions or amounts of pattern information for items and may request additional or different pattern information for an item if that particular version of pattern information is not currently cached in pattern information cache 520. Additionally, in some embodiments, the physical appearance of other items stored together with an item may be used to determine the amount of pattern information to present for the item to be picked. For example, in one embodiment, if a red item to be picked is stored together with other red (or reddish) items, more pattern information may be presented than if the item is stored with non-red items. In another embodiment, the size of other items in the same inventory location may be used to determine how much pattern information to present. For instance, the relative size of an item in comparison to other items in the same information area may be presented as part of the pattern information.

In some embodiments, pattern information may also indicate a relative size, either vertically, horizontally, or both, of the item in relation to the inventory area, such as a bin or shelf, in which it is stored. Additionally, in some embodiments, pattern information may indicate a relative size, either vertically, horizontally, or both, of an item in relation to the size of other items in the same inventory area. For example, in one embodiment, pattern information for a tall book may indicate that the book is the tallest item in the inventory area. In another embodiment, pattern information for a wide box may indicate that the item is the widest item on a shelf of items. In some embodiments the relative size of an item may be presented as secondary pattern information, while in other embodiments the relative size of an item may always be included when presenting pattern information.

The position of the item in an inventory area may also be indicated in presented pattern information, according to certain embodiments. For example, in one embodiment, pattern information for a book may indicate that the book should be on the left side of a shelf of books. In one embodiment, the exact position of an item in relation to the other items in an inventory area may be indicated by presented pattern information. In other embodiments, however, only an approximation of the item's position may be included with presented pattern information. For instance, pattern information may indicate that an item is generally in the middle of an inventory area. In some embodiments the position of an item may be presented as secondary pattern information, while in other embodiments the position of an item may always be included when presenting pattern information.

In some embodiments, the minimum, or optimal, amount of pattern information required to identify an item may be "learned" over time by control system 400, communication device 350, or another computer system at an order fulfillment facility. For example, control system 400, in one embodiment, may be configured to recognize that picking agents frequently, or always, require secondary pattern information when identifying a particular item, and control system 400 may automatically send secondary pattern information for that item in the future.

Figure 5C:
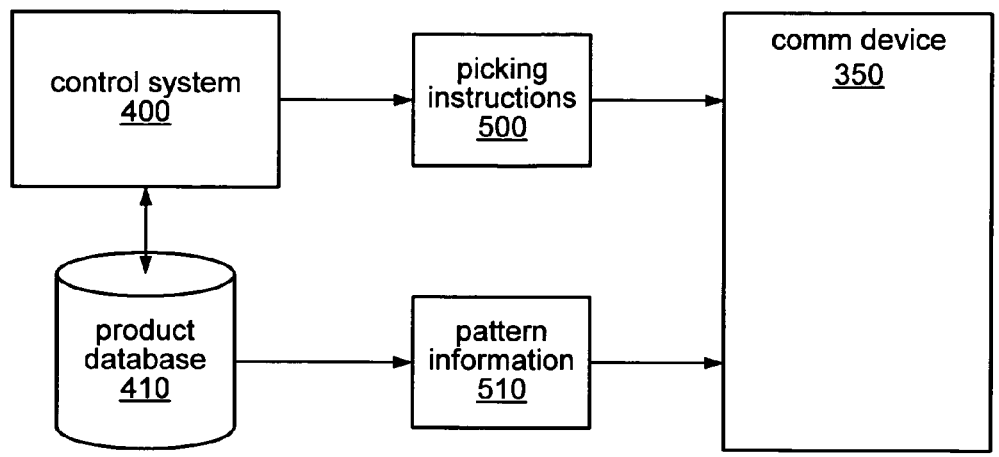

In some embodiments, communication device 350 may be configured to access a central database of pattern information in order to obtain pattern information for an item to be picked. In such an embodiment, as illustrated by FIG. 5C, control system 400 may send communication device 350 instructions regarding which item or items to pick, and communication device 350 may be configured to retrieve the appropriate pattern information from a database, such as product database 410.

Figure 5D:
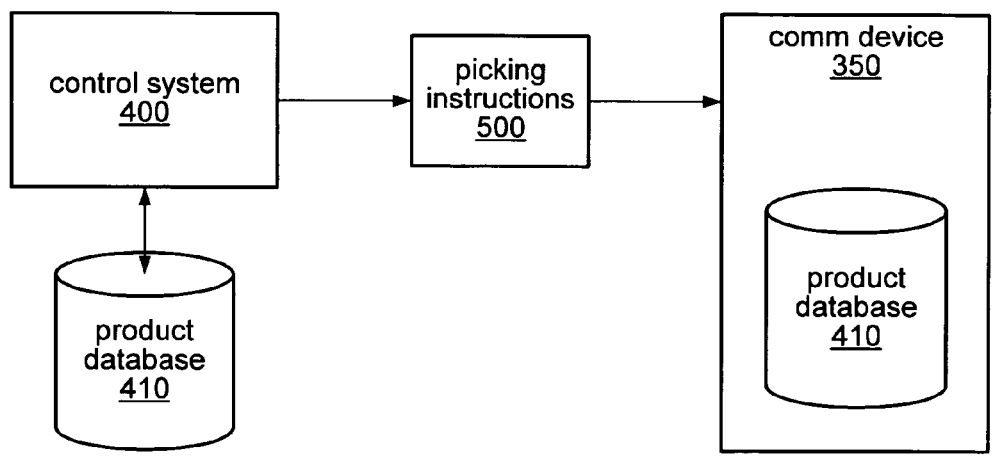

FIG. 5D illustrates a communication device 350 configured to store a complete product database 410 and which may have pattern information available for any item to be picked, according to one embodiment. In some embodiments, communication device 350 may maintain only pattern information in product database 410, while in other embodiments, communication device 350 may store additional item information, such as descriptions, SKU numbers, and the like. Thus, the amount of information regarding any particular item that control system 400 may send to communication device 350 may vary from embodiment to embodiment depending upon how much item information communication device 350 may be configured to store in a local product database 410. Additionally, in certain embodiments, communication device 350 may be configured to load pattern information for an item directly from a remote product database rather than to receive pattern information from control system 400.

Figure 6:
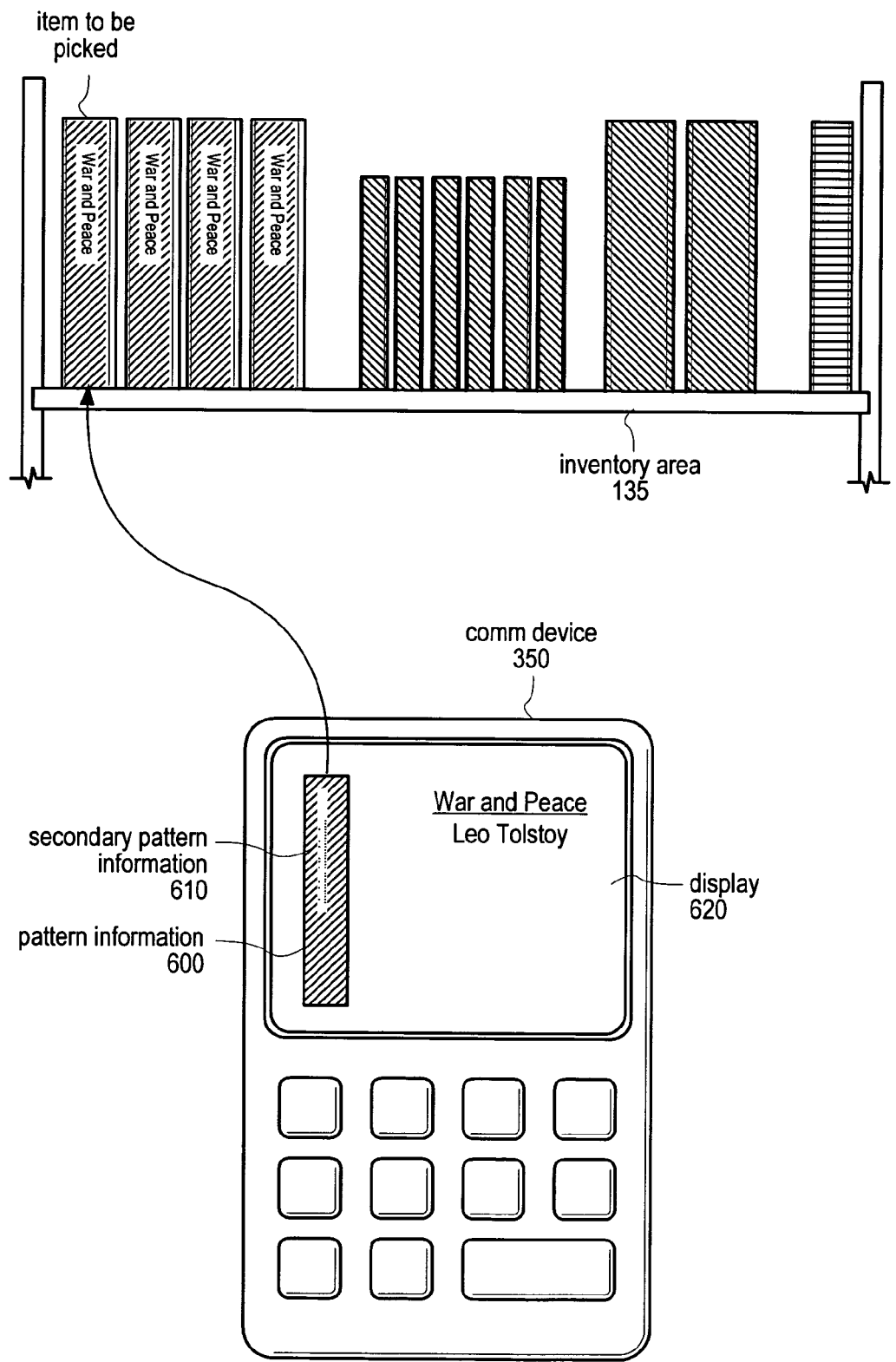
FIG. 6 illustrates a communication device presenting pattern information for an item, according to one embodiment.

FIG. 6 illustrates an exemplary communication device 350 presenting pattern information for an item to aid the identification of that item, according to one embodiment. For example, in one embodiment, communication device 350 may present pattern information 600, which may include secondary pattern information 610, on display 620.

Presented pattern information 600 may provide a visual identifier to distinguish the item to be picked from the other items in inventory area 135. In some embodiments, pattern information 600 may only represent a single dominant color corresponding to a visible view of the item to be picked or of an applied pattern information indicator. In other embodiments though, pattern information 600 may also include other or secondary pattern information corresponding to other visual elements of the visual view of the item to be picked. For example, secondary pattern information 610 may represent the color and approximate size and location of the title text on the spine of a book, CD, DVD or other item, or may represent a shape or pattern printed on an attached sticker or tag, according to different embodiments.

In another embodiment, secondary pattern information 610 may represent a color pattern, such as a device or logo, on the item and visible to a picking agent at inventory area 135. For instance, a publisher's logo may be visible on a book spine or a DVD case and secondary pattern information 610 may indicate the color and/or approximate size and location of such a logo within pattern information 600. As described above, when pattern information 600 is presented, secondary pattern information 610 may or may not be presented depending upon whether secondary pattern information 610 is required to distinguish a particular item from other similar items co-located with the item, according to certain embodiments. For instance, if pattern information 600 indicates a brown color, and there is more than one brown item of the same approximate size, then secondary pattern information 610 may be presented in order to better identify the correct item to be picked, in one embodiment. In other embodiments however, secondary pattern information 610 may always be presented regardless of whether it may be needed to distinguish a particular item over other co-located items.

Thus, the amount and/or type of pattern information supplied to communication device 350, and thus to an agent, may vary from item to item based upon various optimization rules, according to certain embodiments. For instance, control system 400 may include a set of rules, heuristics, or polices that determine the amount and type of pattern information needed to identify or distinguish an item with at least a certain level of confidence. In some embodiments, control system 400 may be configured to perform various types of analysis, possibly in conjunction with optimization rules or policies, in order to determine the amount and/or type of pattern information that should be provided when identifying a particular item. Thus, in some embodiments, rather than always sending all the pattern information available for an item, only a minimum amount of pattern information, such as determined by optimization rules, heuristics or policies, may be provided to picking agents.

In other embodiments, communication device 350 may include different resources and may appear different from what is illustrated in FIG. 6. For example, in one embodiment, communication device 350 may include a head mounted display and may be configured to hands-free control. In other embodiments, communication device 350 may include a scan device for reading bar-type scan codes, such as an SKU or ISBN on an item. In yet other embodiments, communication device 350 may be configured to communicate with a separate scan device.

Figure 7A:
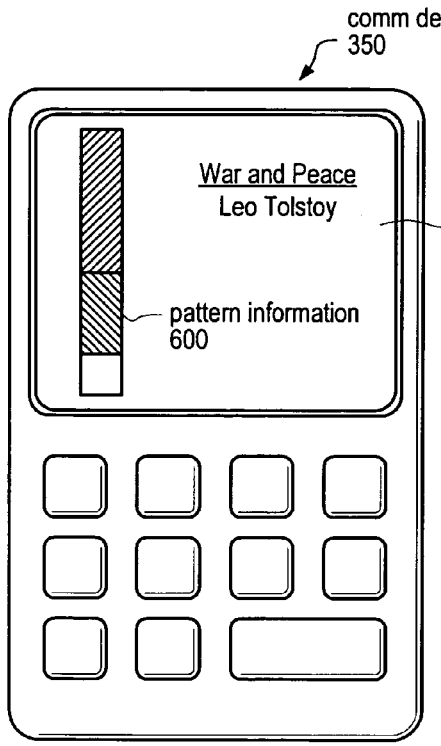
FIGS. 7A through 7D illustrate exemplary communication devices presenting various types of pattern information, according to different embodiments.
Figure 7B:
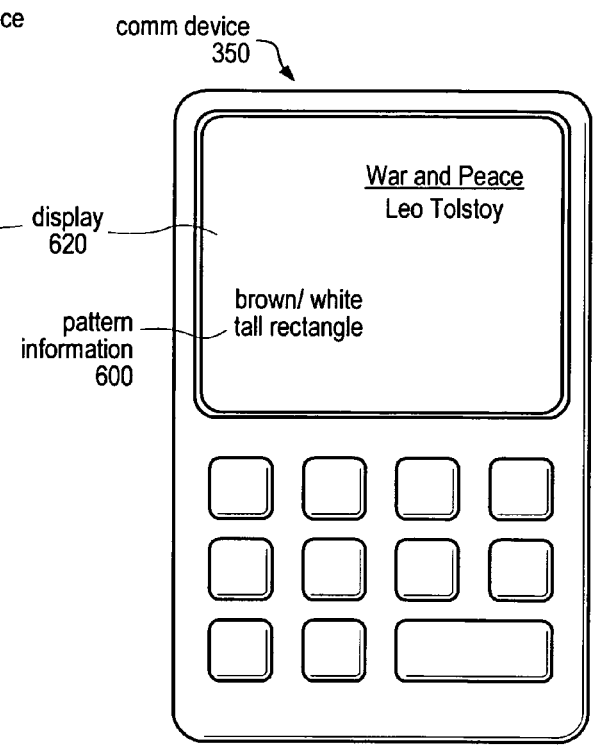
Figure 7C:
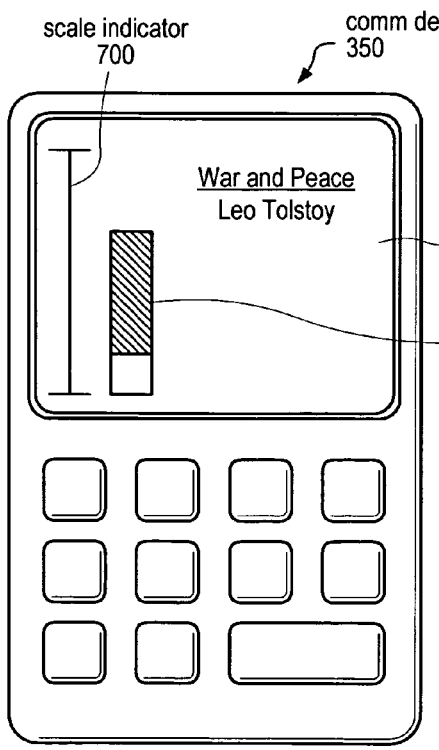

FIGS. 7A through 7D illustrate various manners of presenting pattern information, according to various embodiments. For example, FIG. 7A illustrates a communication device 350 presenting pattern information representing three different color or pattern characteristics of an item, in one embodiment. FIG. 7B shows pattern information presented using text.

While FIGS. 7A and 7B illustrate graphical and textual presentations of pattern information, as described above, FIG. 7C illustrates pattern information presented with an indication of the size and scale of the item to be picked. For example, scale indicator 700 may represent the height of the inventory area, or shelf, in which the item to be picked is stored, in one embodiment. In another embodiment, scale indicator 700 may be presented horizontally and represent the width of the inventory area. Thus, in some embodiments, the presented pattern information may also indicate the approximate size or scale of the item relative to the inventory area in which it is stored. In other embodiments, however, the presented pattern information may indicate the approximate size or scale of an item relative to another standard. For instance, in one embodiment, scale indicator 700 may represent a foot, meter, or other standard linear measurement.

In some embodiments, communication device 350 may be configured to allow a user, such as a picking agent, to request additional pattern information to help identify an item to be picked. For example, in one embodiment, just pattern information 600 may be presented and the picking agent may request additional pattern information through a button or other user interface control of communication device 350. In response, communication device 350 may present secondary pattern information, or may present a scale indicator, according to one embodiment. In order to present additional pattern information for an item, communication device 350 may request additional pattern information from control system 400, or may load additional pattern information from a local or remote product database 410, according to various embodiments. In one embodiment, communication device 350 may initially present no pattern information and may present pattern information only after the picking agent requests, and communication device 350 receives (or retrieves), the pattern information.

Figure 7D:
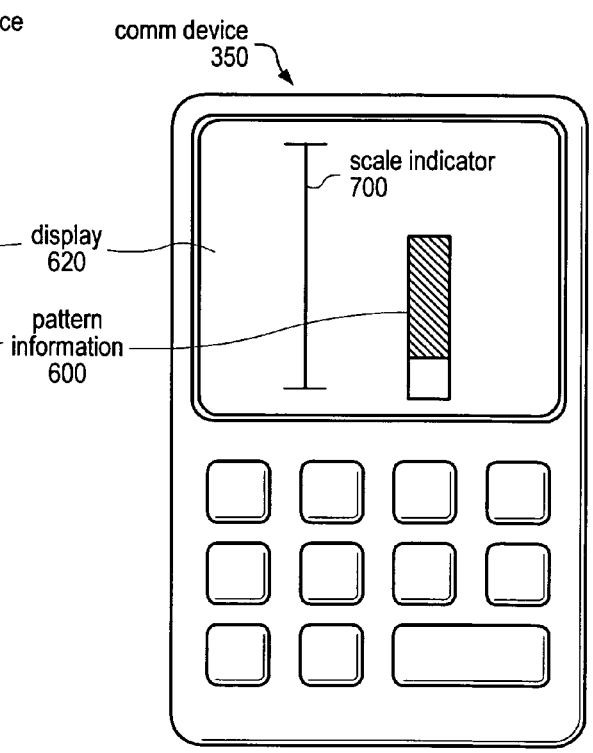

In another embodiment, communication device 350 may be configured to present different amounts of pattern information based on the length of time the pattern information is presented. For example, if a picking agent is having difficulty identifying a particular item, communication device 350 may be configured to present additional or supplemental pattern information for that item. In yet other embodiments, communication device 350 may present only pattern information and may not present an item's title or description, such as illustrated by FIG. 7D. Additionally, communication device 350 may be configured to present only pattern information initially, but may then present an item's title and/or description if a picking agent requests additional pattern information or if the picker is taking a longer time than usual (or longer than a configurable time) to identify the item. In yet another embodiment, communication device 350 may be configured to present additional pattern information if the picking agent scans (using a scan-code reader) an incorrect item. In some embodiments, the amount or fidelity of the presented pattern information may vary based upon the availability of network resources, such as network bandwidth, control system 400, and/or product database 410.

In some embodiments, assigned pattern information may be extrinsic to the physical appearance of the item to be picked. In such embodiments, indicators of the assigned pattern information may be applied to the item or its packaging to facilitate an agent picking the correct item.

FIGS. 8A through 8D illustrate various manners of presenting pattern information that correspond to pattern information indicators applied to items to facilitate picking. In each of these examples, a communication device 350 presents pattern information to a picking agent, as described herein. For instance, FIG. 8A illustrates presented pattern information corresponding to a color of a DVD clamshell-style case, according to one embodiment. FIG. 8B illustrates presented pattern information representing a shape, in this case a star, printed on a sticker applied to a DVD case, according to another embodiment. FIG. 8C illustrates presented pattern information approximating a view of a sequence of contrasting color bars printed on a sticker applied to a DVD case, according to yet another embodiment. In other embodiments, pattern information, such as that illustrated in FIGS. 8A through 8C, may correspond to printed colors, shapes, or patterns of black and white or contrasting color shapes printed on tags attached to a DVD case, rather than on stickers, or printed directly on DVD cases.

In some embodiments, communication device 350 may present only pattern information and may not present an item's title or description. In still other embodiments, additional information may be needed to distinguish between similar items in a single inventory area. FIG. 8D illustrates one embodiment of presented pattern information that includes secondary pattern information corresponding to a second indicator applied to a DVD or its packaging. In this example, a representation of both a colored clamshell case and a star sticker are presented. In still other embodiments, a textual representation of pattern information may be presented alone or in combination with other presented pattern information. While FIGS. 8A through 8D are described above regarding the use of applied pattern information indicators for DVDs, it should be noted that applied pattern information indicators may be used with virtually any items that need to be picked from among multiple, similar items, such as CDs, video games, software, books, jewelry, electronics, clothing, household items, etc.

In some embodiments, different products stored in a multi-shelf inventory area, whether similar or not, may use the same type of pattern information indicators, such as colored packaging, stickers, or tags. In other embodiments, different products stored in a multi-shelf inventory area may use different types of pattern information indicators, as illustrated in inventory areas 135a-135f of FIG. 3C. In some embodiments, items employing different types of pattern information indicators may be mixed within a single inventory area, shelf, bin, etc. In still other embodiments, some of the items stored in a single inventory area may be easily distinguished by pattern information corresponding to an approximate view of the items, while others in the same inventory area may require applied pattern information indicators, such as tags, stickers or additional packaging, to facilitate item identification. In general, any combination of pattern information indicators may be used within a single inventory area, according to various embodiments.

In some embodiments, rather than using a computer-based communication device, printed pick lists including presented pattern information may also be used to identify items from inventory. In other embodiments, communication device 350 may include, or may be used in conjunction with a head mounted display for presenting pattern information. In one embodiment, pattern information may be presented on a head-up display, or other transparent or semi-transparent display device configured to present pattern information in front of a picking agent's eyes while still allowing a picking agent to see through the display. In yet another embodiment, pattern information may be presented auditorily, such that a picking agent can hear the pattern information. In general, various methods for presenting pattern information may be used in different embodiments, depending on the specific nature of each embodiment.

Figure 9:
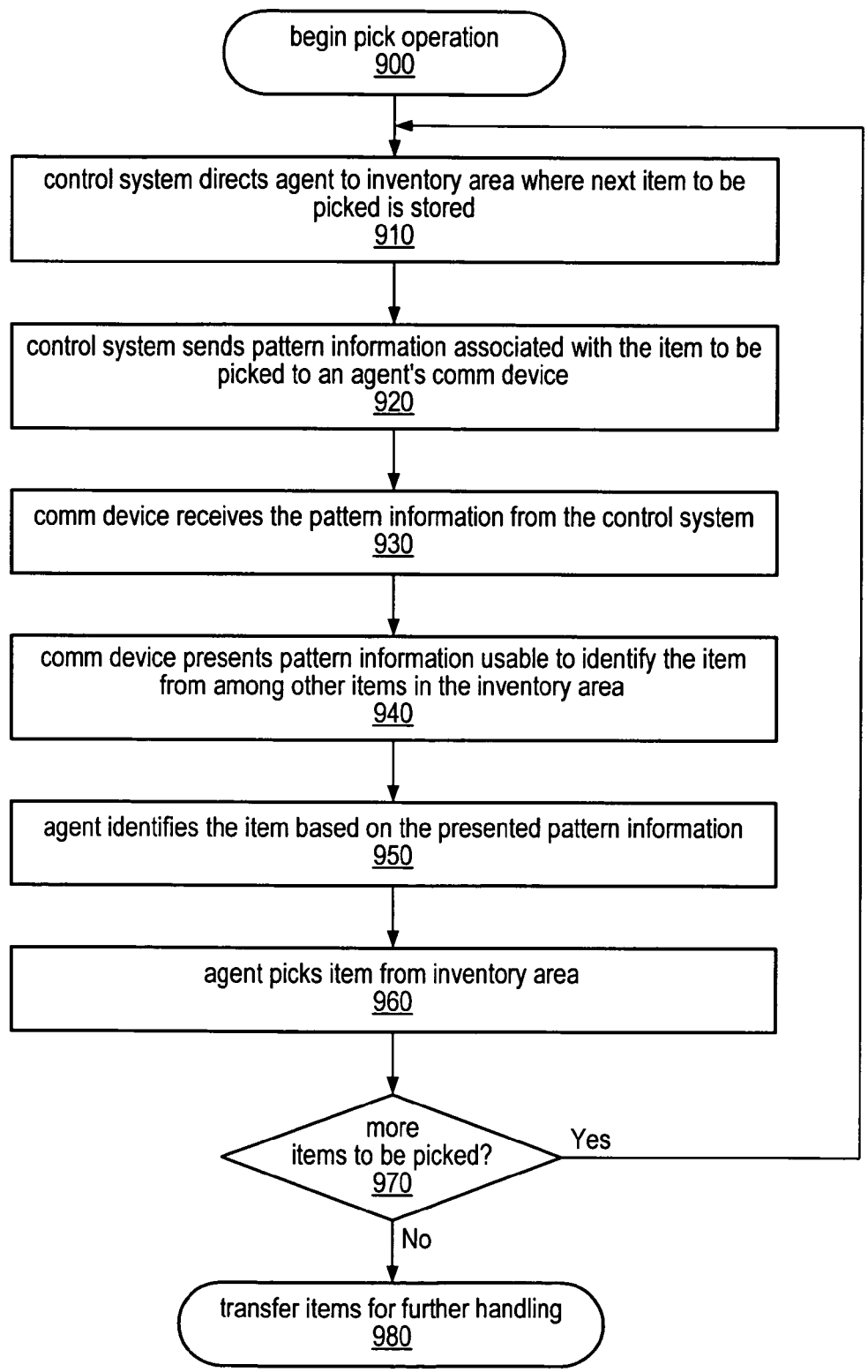
FIG. 9 is a flowchart illustrating one embodiment of a method for using pattern-based item identification.

FIG. 9 is a flowchart illustrating one embodiment of a method for using pattern information for item identification. In some embodiments, a control system may direct an agent to an inventory area where a next item to be picked is stored, as illustrated by block 910. For instance, control system 400, described above, may send picking instructions regarding an item to be picked to a communication device, such as communication device 350, directing a picking agent to retrieve the item from an inventory area, such as inventory area 135. Such instructions may direct the picking agent to a particular inventory area and may include a description of the item to be obtained.

A control system, such as control system 400, may also send pattern information associated with the item to be picked to the agent's communication device, such as communication device 350, as illustrated by block 920, and communication device 350 may receive the pattern information from control system 400, as illustrated by block 930, and described above regarding FIGS. 5A through 5D. Communication device 350 may then present the pattern information usable to identify the item from among other items in the inventory area, as illustrated by block 940. As described above, communication device 350 may present the pattern information in a number of ways including, but not limited to, graphically, textually, or both, in some embodiments.

The agent may then identify the item to be picked based on the presented pattern information, as illustrated by block 950 and may pick the item from the inventory area, as illustrated by block 960. If there are more items to be picked by this agent, as illustrated by the positive exit from decision block 970, the method illustrated by FIG. 9 begins again with control system 400 directing the agent to another inventory area where the next item to picked may be stored.

In some embodiments, control system 400 may determine the number of items to be picked by the agent, and may also determine whether there are more items to be picked, as illustrated by decision block 970. In other embodiments, the agent may be able to decide whether to pick additional items or not. For example, the agent may decide whether or not to pick additional items based upon the total load of items the agent is currently carrying. For instance, if the agent has picked bulky or heavy items, the agent may be able to notify control system 400 through communication device 350 not to provide any further picking instructions while the agent transfers the already picked items to a sorting station, in one embodiment. If there are no more items to be picked by this agent, as illustrated by the negative exit from decision block 970, the items may be transferred to another location for additional handling. For instance, the agent may transfer the picked items to a sorting or packing station, as described above.

Figure 10:
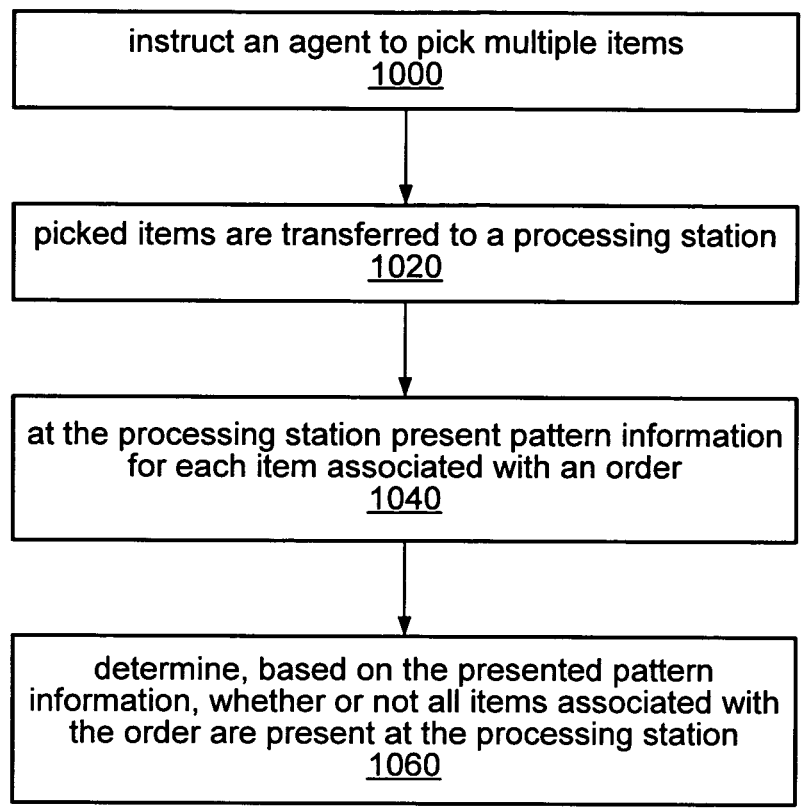
FIG. 10 is a flowchart illustrating another embodiment of a method for using pattern-based item identification.

FIG. 10 is a flowchart illustrating one embodiment of a method for using pattern information for order verification. For example, control system 400 or communication device 350 may instruct a picking agent to pick multiple items from inventory, as illustrated by block 1000. As described above, control system 400 may send pick instruction to portable communication device 350 carried by the agent and communication device 350 may present the received instruction for the agent. The instructions may include one or more items to be picked from inventory.

The picked items may then be transferred to a packing station, as illustrated by block 1020. In some embodiments, the picking agent may transfer the items to a sorting station and a sorting agent, or a mechanical conveyance device, may then transfer the sorted items to the packing station. At the packing station, pattern information for each item associated with an order may be presented, as illustrated by block 1040. For instance, the packing station may be equipped with a device configured to receive order information and pattern information for items associated with the order. In another embodiment, a packing agent at the packing station may carry a communication device such as communication device 350 that may be configured to present the pattern information.

The agent at the packing station may then determine based on the presented pattern information whether or not all the items associated with the order are present, as illustrated by block 1060. For example, the agent may use presented pattern information to identify each item of an order in turn when packing them into a box for shipment. In another example, the agent may use the pattern information to quickly scan a group of items associated with an order to ensure that the entire order is present for packing. In certain embodiments, presented pattern information may be used to aid packing agents in selecting an appropriate box (or other container) in which to pack items. For example, if there are numerous sizes and/or types of boxes, pattern information may be associated with each of the different types and presented as an aid for selecting the appropriate box for packing/shipping.

In some embodiments, pattern information for more than one item may be presented at one time allowing an agent to quickly determine whether all necessary items are present. For instance, in one embodiment, an agent may be able to use presented pattern information to quickly determine whether a blue item, a red and white item, and a brown item are present for an order. In another example, pattern information indicating the relative size of an item as compared to the container in which the item is currently stored may be presented to aid in ensuring that all items are present. For example, after items for an order are packed in a box for shipping, an agent may use presented pattern information including the relative size of one or more of the items to the size of the box to verify that all the correct items are present.

Figure 11A:
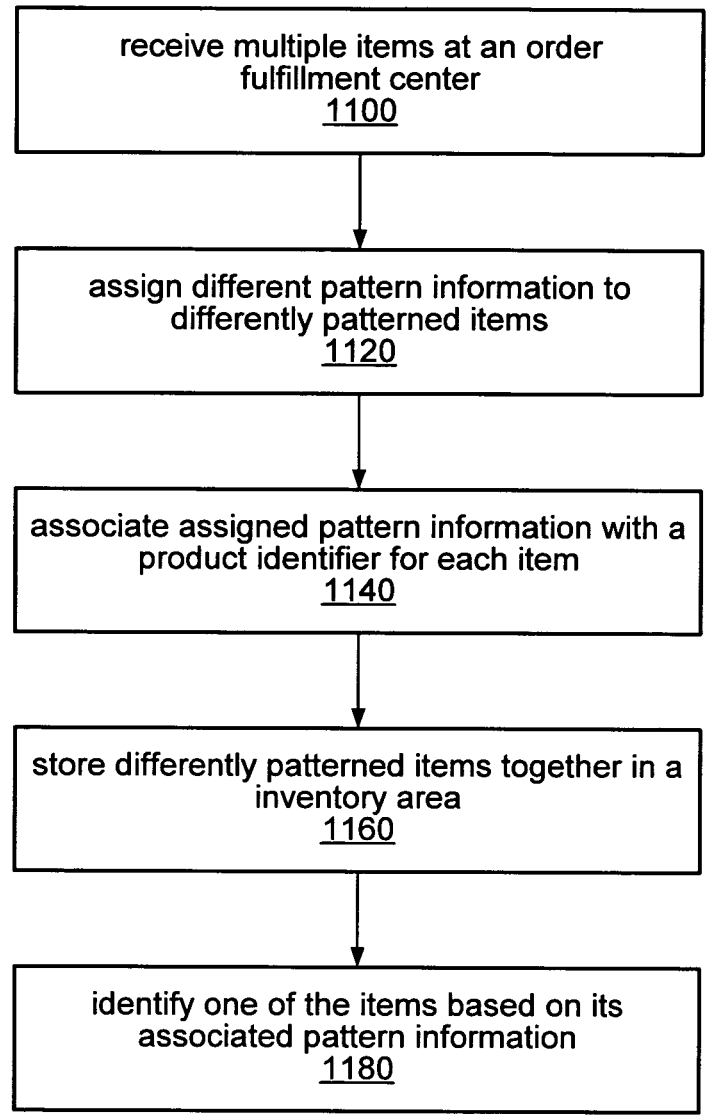
FIG. 11A is a flowchart illustrating one embodiment of a method for determining and assigning pattern information for an inventory item.

FIG. 11A is a flowchart illustrating one embodiment of a method for assigning pattern information to items. An order fulfillment center or facility may receive items such as through receiving stations 180, as illustrated by block 1100.

Different pattern information may be assigned to differently patterned items, as illustrated by block 1120. For example, in one embodiment, pattern information may be manually assigned to each item by an agent, either randomly or by following certain guidelines, as that item is received into the fulfillment center. For example, in one embodiment, only a dominant color of a view of the item is used as the pattern information for that item. As described above, in some embodiments, pattern information comprising an indication of a single, dominant color for the item may be enough for an agent to efficiently distinguish and identify the item from among other co-located items. In other embodiments, however, a dominant color and a representation of the approximate size and shape of the item may be used as pattern information. In yet other embodiments, pattern information may be associated with a particular item type rather than with individual items. For instance, if generally only one item of a particular item type is stored in an inventory area (with other items of other different item types), presenting pattern information associated with the item type may enable a picking agent to correctly identify the item, according to one embodiment. In other embodiments, pattern information may be associated with a vendor rather than an item or item type. For example, if a vendor uses particularly distinctive packaging, or a unique logo generally visible on all their items, displaying pattern information indicating the vendor may enable a picking agent to quickly locate and identify an item from that vendor, especially if an item is the only item from that vendor in an inventory area.

The manner in which the pattern information is encoded and stored may vary from embodiment to embodiment. For instance, in one embodiment, a standard set of colors and shapes may be used and the color and shape of an item may be represented by two identifiers. For example, perhaps 16 basic colors are represented by numbers from 0-15 and 16 different shapes are also represented by numbers from 0-15. In such an example, a dominant representative color for an item may be chosen from the list of 16 color identifiers and similarly a shape identifier corresponding to, a standard shape approximating the shape of the relevant view of the item may be chosen. These two identifiers may be then be encoded into a single byte.

In other embodiments, however, actual color values may be used as pattern information. And in yet other embodiments, more complicated and exact models of the size and shape of an item may be used in pattern information for the item. Any of a number of different formats may be used to represent and store the pattern information for an item, from 2D graphic files, to 3D wire frame constructs of the item, according to various embodiments, and depending upon the amount of pattern information required to identify an item in any particular order fulfillment facility.

In some embodiments, pattern information may be manually assigned and associated with an item. In other embodiments, however, the assignment of pattern information may be automated using various imaging hardware and software, such as hardware and software controlled by control system 400. For example, in one embodiment, an image capture device, such as a digital camera, scanner, web cam, etc, may be used to capture an image of a view of the item. In another embodiment, pre-existing images of an item may be used, rather than capturing a new image, to determine pattern information. For example, marketing images of an item, or existing images used for inventory tracking, may be used to determine pattern information. In one embodiment, the view scanned corresponds to a view of the item that will be visible to a picking agent at the inventory area in which the item will be stored. In one embodiment, however, the captured image and resulting pattern information may include some of the surrounding environment of the item. For example, part of the inventory area in which the item is stored may be included in the captured image and also may be included in the determined pattern information. In another example, one or more of the other items stored in the same inventory area as the item may be included in the captured image and perhaps included in the pattern information for the item. Image analysis software, for example, executing on control system 400, may then be used to determine and assign the pattern information based upon the captured image of the view of the item, in one embodiment.

In yet other embodiments, one or more vendors supplying items may determine and associate pattern information for some or all of the items supplied. For example, the vendor may send information associating pattern information with one or more items to be shipped to the order fulfillment facility. Additionally, in one embodiment, pattern information for an item may be based on the vendor of the item, rather than only on the item itself. For example, a particular vender may have a distinctively patterned logo and that logo may be considered when determining pattern information for an item from that vendor.

The pattern information, once assigned, may then be associated with a product identifier for each item, as illustrated by block 1140. For example, the pattern information may be stored in a product database, such as product database 410, and associated with the corresponding item's identifier, such as an SKU, SBIN, or other product identifier, according to one embodiment. The pattern information may be entered into the database by an agent, for example by using a keyboard or other input/output device of control system 400 or another host computer, or may be entered into the database automatically by program instructions executing on control system 400 as part of determining and assigning the pattern information, in some embodiments.

In some embodiments, differently patterned items may be stored together in an inventory area, as illustrated by block 1160. As described above, an agent or control system 400 may record the location of each stored item in a product database, which may include a description, inventory location number, or other data representing the location of each item in the inventory, indexed by a product identification code, for example.

As described herein, one of the items may be identified based on its associated pattern information, as illustrated by block 1180. A picking agent may be provided instructions to locate and obtain a particular item from an inventory area. As described above, the pattern information associated with an item may be presented to aid an agent in identifying that item from among other items. Different levels and/or amounts of pattern information may be assigned to a single item so that, in some embodiments, different amounts of pattern information may be used to identify that item depending upon the other items with which that item might be stored, as described above.

In some embodiments, pattern information used for item identification may not correspond to a visually distinguishable feature of an item itself, such as the color or size or the item, but may instead be a visually distinguishable pattern extrinsic to the physical appearance of the item and assigned to it as described herein. One such embodiment is illustrated by the flowchart in FIG. 11B. After items are received, as in block 1110, pattern information may be determined, as illustrated in block 1130, by any of various methods. In some embodiments, an agent may manually assign pattern information to each item, either randomly or by following certain guidelines, as that item is received into the fulfillment center. For example, an agent may assign pattern information to each item as it is received by cycling through a rotation of pattern information options, in one embodiment. In other embodiments, however, the assignment of pattern information may be automated using various scanning hardware and software, such as hardware and software controlled by control system 400. For example, an agent may scan a bar code or other product identification code of the item as it is received and software, such as software running on control system 400, may determine the pattern information assignment for the item, in some embodiments. In another example, an agent may input a product identification code, such as an SKU code, a UPC, or the like, to control system 400 through a keyboard or other input/output device and control system 400 may determine the pattern information. In some embodiments, software executing on control system 400 may be used to determine pattern information for an item by retrieving pattern information from a database, such as product database 410. In other embodiments, pattern information may be assigned manually, such as by an agent, or automatically, such as by software executing on control system 400, based on a vendor rather than an item or item type.

In some embodiments, determining and assigning pattern information may be done randomly or pseudo-randomly by software running on a control system, such as control system 400, when items are received and an indication of the pattern information may be applied to the item to facilitate identification. Determining pattern information pseudo-randomly may involve executing program instructions on control system 400 configured to apply a mathematical distribution algorithm to one or more characteristics of the item, in some embodiments. For example, a uniform distribution algorithm may determine pattern information corresponding to one of eight color choices based on a mathematical manipulation of a product identification code, such as an item's inventory identification number, Universal Product Code (UPC), Stock-Keeping Unit (SKU) code, model number, version number and/or other designation (including proprietary designations), according to various embodiments. In one embodiment, for example, each item in a product catalog may be mapped to one of the numbers 0-7 using the algorithm (<PIN>% 71% 8), where PIN corresponds to a unique product identification number for each product. In this example, each of the numbers 0-7 corresponds to one of eight color choices, which are assigned to the items according to the algorithm described. According to this example, if six items are randomly stored in a single inventory area, the probability of each item being the only one in the inventory area with a given assigned color is 51.3%. Thus, in this example, the probability of being able to pick the correct item from among the items in the inventory area using only the assigned color is 51.3%.

Please note, that the product identifier, identification code, UPC, SKU or other product number used to determine pattern information, such as by applying a mathematical distribution algorithm, may not be the same product identifier with which the determined pattern information is associated in the control system database, according to some embodiments. Thus, in some embodiments, one product number, identifier or code may be used to determine pattern information for an item and the determined pattern information may be associated with a different product number, identifier or code for the item. For example, a vendor's product code for the item may be used to determine pattern information and the determined pattern information may be associated with a different product code for the item assigned at the materials handling facility.

In some embodiments, a single algorithm for determining pattern information may be applied, as in 1130, to different item types, such as books, clothing, electronics, or jewelry. In other embodiments, different algorithms for determining pattern information may be applied to different item types. Different algorithms for determining pattern information may result in a different number of pattern information choices and, thus, a different probability of being able to pick a correct item using only the assigned pattern information, according to various embodiments.

In some embodiments, pattern information may be determined by software executing on control system 400 based on a capacity of an item, such as for similar disk drives capable of storing different amounts of data, or a size of an item, such as for different sizes of the same item of clothing, or based on another characteristic of the item, such as the color of the item. For example, otherwise identical items of clothing may be assigned different pattern information based upon the color of each item. In other embodiments, pattern information may be determined based on a date code, such as a manufacturing date, release date, shipping date, delivery date, expiration date or any other date associated with the item. Pattern information may be determined based on differences in lot numbers, version numbers, or serial numbers of otherwise identical items, in some embodiments. In other embodiments, one or more vendors supplying items may determine and associate pattern information for some or all of the items supplied. For example, the vendor may send information associating pattern information with one or more items to be shipped to the order fulfillment facility. Additionally, in one embodiment, pattern information for an item may be manually or automatically assigned when received based on the vendor of the item, rather than only on the item itself. For example, if two vendors supply otherwise identical items, the items may be assigned different primary or secondary pattern information to facilitate distinguishing between the items supplied by each vendor.

Where secondary pattern information is provided to facilitate identifying an item, the secondary pattern information may be determined using any of the methods described above for determining pattern information, according to various embodiments. In general, any combination of the techniques described above for determining pattern information may be used to determine secondary pattern information, including an agent manually assigning pattern information randomly or using guidelines, or software on control system 400 determining pattern information, according to various embodiments.

In some embodiments, the methods used for determining pattern information may result in identical items being assigned identical pattern information when received at the same order fulfillment center. Identical items received at different order fulfillment centers may also be assigned identical pattern information, in some embodiments. In other embodiments, identical items may be assigned different pattern information, such as if a rental facility had a need to identify particular copies of a product for tracking the item's rental history. In some such embodiments, secondary pattern information may be used to distinguish individual copies of identical items that have the same primary pattern information. For example, in some embodiments, software running on a control system, such as control system 400, may track the rental and return of each copy of a rental item and may determine when maintenance should be performed, or when the item should be taken out of service, based on the number of times the item has been rented. In such embodiments, control system 400 may alert agents that an item is due for service or retirement when it is scanned by agents upon being received back after being rented. Similarly, software running on control system 400 may track service requests corresponding to individual rental items in order to determine if the item needs to be repaired or replaced in inventory, according to some embodiments.

When pattern information is not related to the physical appearance of an item, it may take any of various forms, according to different embodiments. In some embodiments, the determined and assigned pattern information may be a single color. In other embodiments, it may be a single shape. Pattern information may be a "human-readable bar-code", such as a sequence or pattern of black and white or other contrasting color bars or other shapes, in other embodiments. For example, various sequences of three horizontal bars, each of which may be one of two colors, may correspond to eight different pattern information choices. In this example, if the bars may be either red ("R") or blue ("B"), the pattern information choices would be: RRR, RRB, RBR, RBB, BRR, BRB, BBR, and BBB. Determined and assigned pattern information may be any easily distinguishable visual symbol, feature, or attribute, such as a letter or letters, a number or numbers, a pictograph, or any combination of symbols, shapes and colors, according to various embodiments. While the above examples included three bars and two colors, other embodiments may utilize more than three bars and/or more than two colors when implementing human readable bar-codes.

Also, according to various embodiments, pattern information may include a combination of pattern information representing the appearance of an item and extrinsic pattern information unrelated to the physical appearance of the item. For instance, in one embodiment, a book may be assigned primary pattern information that approximates the appearance of the book's spine, but extrinsic pattern information unrelated to the appearance of the book may be applied to differentiate between different versions of the same book. For example, different pattern information may be applied to different versions of the book to differentiate between small and large print versions or between standard and first editions of the book. In one such example, primary pattern information may represent the color of the book spine, such as "blue", while secondary pattern information may represent the color of a sticker applied to the book, such as "red", which may correspond to the first edition version. Similarly, secondary pattern information may be used to distinguish between different versions of an item, such as between different colors of an otherwise identical household item, or between video games or other software products that run on different computer platforms, according to various embodiments.

Once pattern information has been determined for an item, it may be associated with a product identifier for the item, as illustrated in block 1140. As described above with respect to FIG. 11A, pattern information may be stored in a database, such as product database 410, and associated with the corresponding item's identifier, such as an SKU, SBIN, or other product identifier, according to one embodiment. Different levels and/or amounts of pattern information may be assigned with a single item so that, in some embodiments, different amounts of pattern information may be used to identify that item depending upon the other items with which that item might be stored, as described above. The manner in which the pattern information is encoded and stored may vary from embodiment to embodiment. For instance, in one embodiment, a standard set of colors and shapes may be used and the color and shape of a pattern information indicator may be represented by two identifiers. For example, perhaps 16 basic colors are represented by numbers from 0-15 and 16 different shapes are also represented by numbers from 0-15. In such an example, primary pattern information for an item may be chosen from the list of 16 color identifiers and similarly a shape identifier corresponding to secondary pattern information for the item may be chosen. These two identifiers may be then be encoded into a single byte, according to one embodiment.

In embodiments in which the pattern information associated with each item does not represent the appearance of the items, the items may be prepped for use with pattern-based item identification by applying an indicator of pattern information to each item or the item's packaging, as illustrated in block 1150. In various embodiments, indicators of determined pattern information may be attached directly to an item or to the packaging of the item. As noted above, these may be stickers, tags, or other printed indicators attached to the item or its packaging. In some embodiments, the packaging of the item may be selected to correspond to the determined pattern information. For example, CDs or DVDs may be inserted into differently colored or patterned clamshell-style cases or sleeves when they are received, according to their determined pattern information. In another embodiment, CDs or DVDs may be inserted into colored or patterned packaging corresponding to determined pattern information by the vendor before being shipped to the order fulfillment facility. In other embodiments, the packaging of an item may be modified to indicate the determined pattern information, such as by applying a color, shape, or human-readable bar-code directly on a wrapper, sleeve, bag, box, etc.

Where secondary pattern information is necessary to distinguish between similar items, a second pattern information indicator may be applied to an item, in some embodiments. Similarly, if the primary pattern information associated with an item represents a view of the item, but secondary pattern information does not, an indicator of the secondary information may be applied to the item, in various embodiments. For example, stickers may be applied to different versions of a book to differentiate between small and large print versions or between standard and first editions of the book, when the dominant color of the books is the same.

Pattern information indicators may be attached permanently or temporarily, according to different embodiments. In some embodiments, pattern information indicators may be used only once. In other embodiments, they may be reused and applied to identical, similar, or even dissimilar items having the same determined pattern information. For example, a tag attached to an item may be removed before the item is shipped and the tag may be attached to another item, such as a returned item or a newly received item, having the same determined pattern information.

Applying an indicator of pattern information, illustrated by block 1150, may be done at one or more storage preparation stations 290, in some embodiments. In other embodiments, pattern information indicators may be applied to items by receiving agents or inventory stocking agents at various stations within an order fulfillment facility. Additionally, vendors may apply pattern information indicators to items before shipping them to the order fulfillment facility, in some embodiments. For example, a vendor supplying a set of DVDs to the facility may enclose the DVDs in colored clamshell style cases before shipping them to the order fulfillment facility. In still other embodiments, pattern information indicators may be determined, printed, and even applied automatically using automated machinery and custom software programs employed by receiving or inventory stocking operations and executing on control system 400 or another computing device.

Pattern information indicators may, in some embodiments, be used only while the item is within the order fulfillment facility and may be removed before an item is packed or shipped. For example, clothing may be stored on differently colored or patterned hangars in the facility and may be taken off of the hangars before packing and shipping. In other embodiments, indicators of pattern information may be applied to an inventory storage area itself. For example, items with different determined pattern information may be stored in the order fulfillment facility on differently colored or patterned shelves or in differently colored or patterned baskets, bins, racks, or boxes within a single inventory area. In some embodiments, items with different determined pattern information may be stored in the order fulfillment facility on shelves or racks or in bins, baskets, or boxes that have a sticker, tag, or other pattern information indicator attached.

Once pattern information has been assigned to an item and associated with a product identifier for the product, and an indication of the pattern information has been applied, the item may be stored in one of a plurality of inventory areas 135 in the order fulfillment facility, as illustrated in block 1170. In some embodiments, software, such as software running on control system 400, may automatically determine one or more inventory areas in which to store the item such that the item may be easily distinguishable, based on the determined pattern information, from other co-located items. In other embodiments, determining an inventory area for an item may be done manually by inventory stocking agents. Inventory stocking agents may select an inventory area randomly, in some embodiments. In other embodiments, however, inventory stocking agents may select an inventory area for an item according to various guidelines to avoid inventory areas already containing a similar item, such as a second DVD, with the same determined pattern information. For example, inventory stocking agents may only place items with different pattern information in a single inventory area, in some embodiments. In other embodiments, inventory stocking agents may only place items with the same pattern information in a single inventory area if they are identical items. As described above, an agent or control system 400 may record the location of each stored item in a product database, such as product database 410, which may include a description, inventory location number, or other data representing the location of each item in the inventory, indexed by a product identification code, for example.

Finally, as described herein, one of the items may be identified based on its associated pattern information, as illustrated by block 1190. A picking agent may be provided instructions to locate and obtain a particular item from an inventory area. As described above, the pattern information associated with an item may be presented to aid an agent in identifying that item from among other items. Different levels and/or amounts of pattern information may be assigned to a single item so that, in some embodiments, different amounts of pattern information may be used to identify that item depending upon the other items with which that item might be stored, as described above.

Figure 11B:
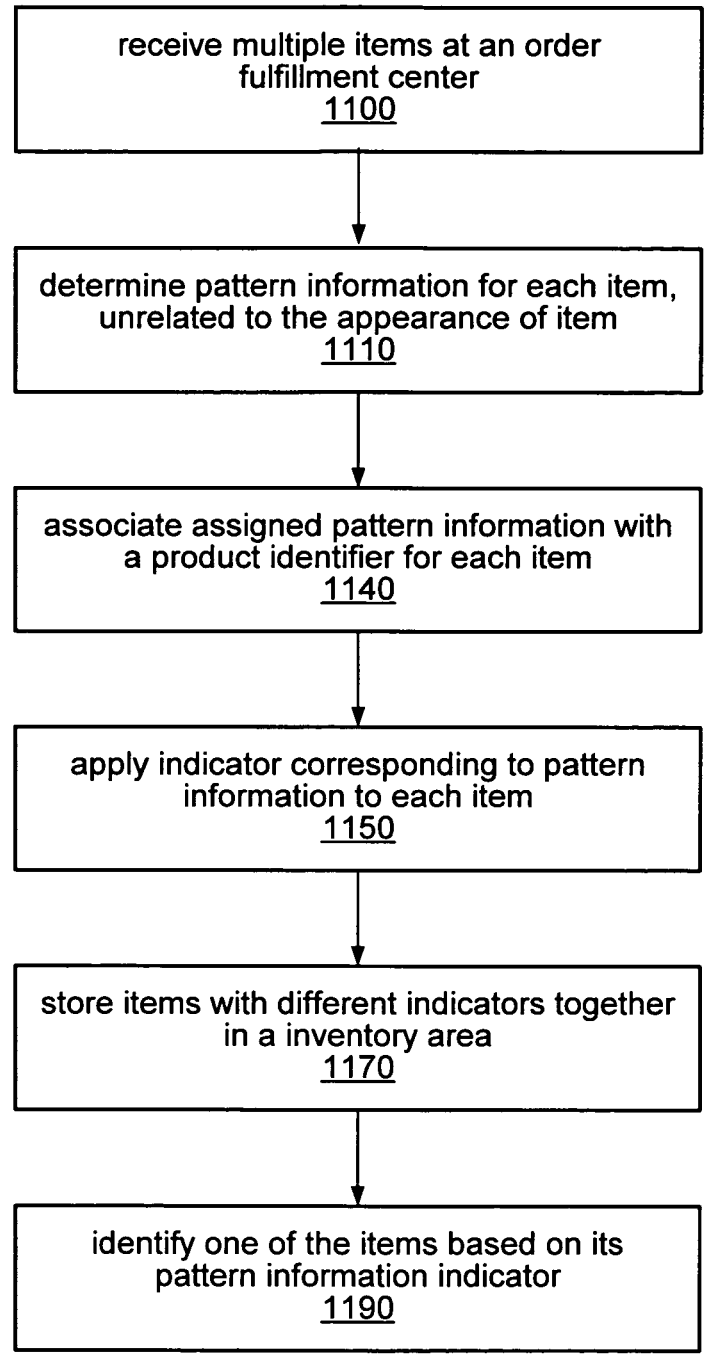
FIG. 11B is a flowchart illustrating another embodiment of a method for determining and assigning pattern information for an inventory item.

Many of the operations illustrated by the flowcharts in FIGS. 11A and 11B may be suitable for automation, according to various embodiments. The amount of automation or automatic pattern information determination and assignment may vary from embodiment to embodiment. For example, in one embodiment, the entire process may be completely automated using various conveying means to move the item into a location for image capturing, and image analysis software executing on control system 400 may then automatically determine pattern information and associate the pattern information with the item based upon an automated identification of the item, such as through the automated scanning of a bar-code, and may store the pattern information in product database 410. In some embodiments, software executing on control system 400 may also automatically determine one or more inventory areas in which to store the item such that the item may be easily distinguishable, based on the determined pattern information, from other co-located items, and may store information about the location in product database 410. In other embodiments, pattern information determination may be automated in an area of the materials handling facility other than receiving. For example, in one embodiment, an automated sorting machine may be modified to include a camera and software to automate the determination of pattern information. For instance, such an automated sorting machine may be configured to read a scan code for each item and determine, possibly via control system 400, whether or not pattern information is currently associated with that item. If no pattern information is currently associated with an item, the sorting machine may be configured to capture images of the item and use those captured images to determine pattern information for the item. In one embodiment, control system 400 may utilize a modified sorting machine to read scan codes and capture images of items, but control system 400 may determine the pattern information and associate the determined pattern information with the item. In other embodiments, however, some or all of the process of determining, assigning and associating pattern information for an item may be performed manually.

Determined pattern information may be adjusted to reflect a difference in lighting or other environmental conditions between the area in which the pattern information was determined and areas in which the pattern information may be presented and used to identify items, according to certain embodiments. In other embodiments, pattern information may be determined using lighting and environmental conditions similar to those in which the pattern information may be presented. For example, in one embodiment, items may be put into an inventory area and pattern information may be determined based on one or more views of the item in the inventory area.

In some embodiments, only new items for which no pattern information has ever been assigned and associated may have pattern information assigned in receiving. In such embodiments, a product database of pattern information may be consulted to determine whether pattern information exists for a particular received item. If pattern information already exists for a received item, that pattern information may be associated with the newly received item. Additionally, in some embodiments, existing pattern information may be compared to the newly received item to ensure that the existing pattern information is still valid, such as by determining whether the existing pattern information still approximates a view of the item, for example.

When pattern information is not based upon a view of the item, as in some embodiments, existing pattern information may be compared to newly determined pattern information for a received item to ensure that the current method for determining pattern information would still result in assigning the same pattern information as previously assigned to similar items. Similarly, when a rental item or purchased item is returned, the validity of previously associated pattern information and/or applied pattern information indicators may be verified according to the information stored in a product database, such as product database 410, or by applying current methods for determining pattern information to the item, according to different embodiments. If a received item, whether new, returned after purchase, or returned after rental, is determined not to have valid pattern information associated with it, new or replacement pattern information may be assigned and/or associated with the item before it is stored in inventory, in some embodiments. Likewise, in other embodiments, if a received item, whether new, returned after purchase, or returned after rental, is determined not to have a valid indicator of pattern information applied, a new or replacement pattern information indicator may be applied to the item before it is stored in inventory. For example, a rental DVD may not be returned in the same clamshell case in which it was shipped, if, for example, the DVD was mistakenly returned in a clamshell case for another DVD rented at the same time.

Figure 12:
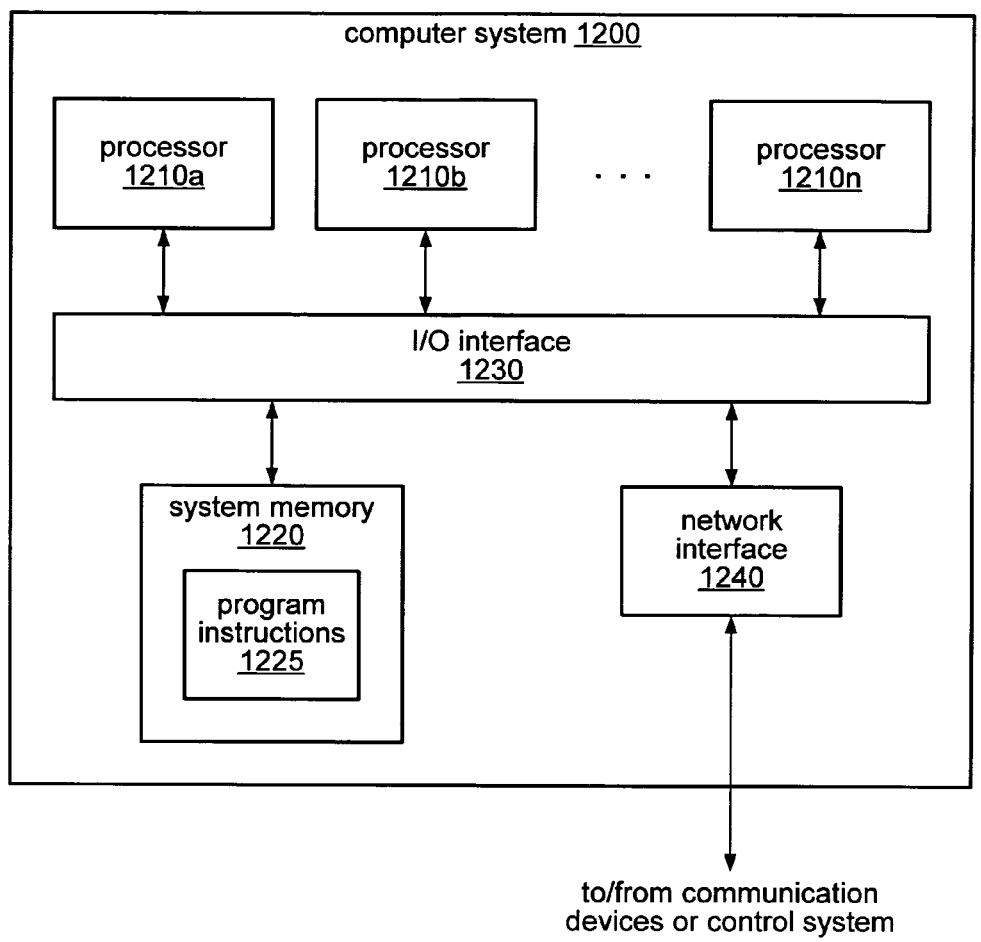
FIG. 12 is a block diagram illustrating an exemplary embodiment of a computer system suitable for implementing pattern-based item identification.

FIG. 12 is a block diagram illustrating an embodiment of a computer system usable to implement pattern-based item identification. In one embodiment, an order fulfillment control system, such as control system 400, or a communication device, such as communication device 350, both illustrated in FIG. 4, may include a general-purpose computer system that includes or is configured to access one or more computer-accessible media, such as computer system 1200 illustrated in FIG. 12. In some embodiments, an order fulfillment facility or other materials handling facility may also include various communication devices, described above, that each may include a general-purpose computer system, such as computer system 1200.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of control system 400, while in other embodiments control system 400 may include elements in addition to computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIP'S ISAs, or any other suitable ISA. In multiprocessor systems, each of processors 1210 may commonly, but not necessarily, implement the same ISA.

System memory 1220 may be configured to store instructions and data accessible by processor 1210. In various embodiments, system memory 1220 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for an order fulfillment control system, such as control system 400, are shown stored within system memory 1220 as code 1225.

In one embodiment, I/O interface 1230 may be configured to coordinate I/O traffic between processor 1210, system memory 1220 and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, for example. In particular, network interface 1240 may be configured to allow communication between computer system 1200 and the various communication devices 350, or control system 400, described above. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1200 via I/O interface 1230. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

In one embodiment, the relationship between control system 400 and communication devices 350 may be a server/client type of relationship. For example, control system 400 may be configured as a server computer system 1200 that may convey instructions to and receive acknowledgements from communication devices 350. In such an embodiment, communication devices 350 may be relatively simple or "thin" client devices. For example, communication devices 350 may be configured as dumb terminals with display, data entry and communications capabilities, but otherwise little computational functionality. However, in some embodiments, communication devices 350 may be computer systems configured similarly to computer system 1200, including one or more processors 1210 and various other devices (though in some embodiments, a computer system 1200 implementing a communication device 350 may have somewhat different devices, or different classes of devices, compared to a computer system 1200 implementing control system 400). It is further contemplated that in some embodiments, the functionality of control system 400 may be distributed across some or all of communication devices 350. That is, in some embodiments, there may be no centralized point of control of the activity of order fulfillment center agents 300; rather, communication devices 350 may function in a cooperative, distributed fashion to coordinate the activities of the order fulfillment facility.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
receiving a plurality of items at a materials handling facility, the facility comprising a plurality of distinct individual inventory storage areas, wherein a plurality of different types of items are stored together in given ones of the distinct individual inventory storage areas;
determining, by a computer, pattern information for a group of the plurality of items:
determining by a computer, other pattern information for another group of the plurality of items, wherein the determined pattern information for the group comprises pattern information that is visually distinguishable, by an agent in the materials handling facility, from the determined pattern information for the other group;
associating, by the computer, the respective determined pattern information with a product identifier for each item;
applying a respective physical pattern information indicator to each item, wherein the physical pattern information indicator corresponds to the respective determined pattern information for that item, and wherein respective physical pattern information indicators are applied to corresponding items of the respective group; and
storing each item in one of the distinct individual inventory storage in the materials handling facility, wherein at least some of the plurality of distinct individual inventory storage areas comprise items with different pattern information indicators.

2. The method of claim 1, wherein said determining pattern information comprises selecting pattern information for each item, wherein said selecting comprises applying a mathematical function to a product identification code of each item to select the determined pattern information from among a plurality of pattern information.

3. The method of claim 1, further comprising, for each of the plurality of items, storing in a database an indication of an association between the respective product identifier, the respective determined pattern information, and one of the plurality of inventory areas in which the respective item is stored, wherein the indication of the association stored in the database is usable in locating one or more of the items from among the plurality of inventory areas.

4. The method of claim 1, wherein said determining pattern information for each of the plurality of items comprises randomly selecting pattern information for one of the items, wherein the randomly selected pattern information is assigned to others of the plurality of items having the same product identify as the one item.

5. The method of claim 1, wherein the pattern information comprises one or more of: a single color, a single shape, a texture, or a sequence of contrasting shapes.

6. The method of claim 1, wherein said storing each item comprises selecting an inventory area for each item from among the plurality of inventory areas, wherein the inventory area is selected independently of the product identifier for the respective item.

7. The method of claim 1, wherein said storing each item comprises selecting an inventory area for each item so as to reduce the number of dissimilar items in each inventory area that have the same associated pattern information.

8. The method of claim 1, wherein said storing each item comprises storing only items with different associated pattern information in a single inventory area.

9. The method of claim 1, wherein said storing comprises storing two or more items with the same pattern information indicators in a single inventory area only if they are identical items.

10. The method of claim 1, wherein said applying comprises one or more of:
attaching the pattern information indicator to packaging of the item;
attaching the pattern information indicator directly to the item;
enclosing the item in a package comprising the pattern information indicator, wherein the item is a digital video disc and wherein the package is a clamshell-style case;
permanently attaching the pattern information indicator to the item; or
temporarily attaching the pattern information indicator to the item.

11. The method of claim 1, wherein said determining comprises assigning identical pattern information to identical items.

12. The method of claim 1, wherein said determining comprises assigning pattern information according to a size or capacity of an item.

13. The method of claim 1, wherein said determining comprises assigning pattern information according to a date code of an item.

14. The method of claim 1, further comprising:
receiving a returned item; and
applying a replacement pattern information indicator to the returned item if it was not returned with a pattern information indicator corresponding to pattern information currently associated with items identical to the returned item.

15. The method of claim 1, further comprising:
presenting instructions to locate the item in one of the plurality of inventory areas, and
wherein said presenting instructions comprises presenting pattern information corresponding to the determined pattern information for the item, wherein the determined pattern information comprises a feature extrinsic to the physical appearance of the item, wherein the presented pattern information represents an indicator applied to the item, and wherein the presented pattern information is usable to distinguish the item from other items stored in the inventory area.

16. The method of claim 1, wherein the pattern information comprises a feature extrinsic to the physical appearance of the item.

17. A system, comprising:
a control system configured to:
determine pattern information for a group of a plurality of items received at a materials handling facility, the facility comprising a plurality of distinct individual inventory storage areas, wherein a plurality of different types of items are stored together in given ones of the distinct individual inventory storage areas;
determine other pattern information for another group of the plurality of items, wherein the determined pattern information for the group comprises pattern information that is visually distinguishable, by an agent in the materials handling facility, from the determined pattern information for the other group; and
associate the respective determined pattern information with a product identifier for each item; and
a database communicatively coupled to the control system, wherein the database is configured to store the determined pattern information for the group, wherein the determined pattern information for the group is associated with the respective product identifier for each of the items of the group.

18. The system of claim 17,
wherein to determine pattern information the control system is further configured to select pattern information for each item; and
wherein to select pattern information, the control system is further configured apply a mathematical function to a product identification code of each item to select the pattern information from among a plurality of pattern information.

19. The system of claim 17,
wherein for each of the plurality of items the control system is further configured to store in the database an indication of an association between the respective product identifier, the respective determined pattern information, and one of a plurality of inventory areas in which the item is stored; and
wherein the indications of the associations stored in the database are usable in locating one or more of the plurality of items from among the plurality of inventory areas.

20. The system of claim 17, wherein said determining pattern information for the group of the plurality of items comprises the control system receiving input from an agent indicating pattern information for one of the items, wherein the pattern information is randomly selected by the agent, and wherein the randomly selected pattern information is assigned to others of the plurality of items having the same product identifier as the one item.

21. The system of claim 17, wherein the pattern information comprises one or more of: a single color, a single shape, a texture, or a sequence of contrasting shapes.

22. The system of claim 17,
wherein the control system is further configured to select an inventory area for each item from among a plurality of inventory areas; and
wherein the inventory area is selected independently of the product identifier for the respective item.

23. The system of claim 17, wherein the control system is further configured to select an inventory area for each item from among a plurality of inventory areas so as to reduce the number of dissimilar items in each inventory area that have the same associated pattern information.

24. The system of claim 17, wherein the control system is further configured to select an inventory area for each item from among a plurality of inventory areas so as to store only items with different associated pattern information in a single inventory area.

25. The system of claim 17, wherein the control system is further configured to select an inventory area for each item from among a plurality of inventory areas so as to store two or more items with the same pattern information indicators in a single inventory area only if they are identical items.

26. The system of claim 17, wherein a pattern information indicator is one or more of:
   attached to packaging of the item;
   attached directly to the item;
   attached to a package enclosing the item, wherein the item is a digital video disc and the package is a clamshell-style case;
   permanently attached to the item; or
   temporarily attached to the item.

27. The system of claim 17, wherein to determine pattern information, the control system is further configured to assign identical pattern information to identical items.

28. The system of claim 17, wherein to determine pattern information, the control system is further configured to assign pattern information according to a size or capacity of an item.

29. The system of claim 17, wherein to determine pattern information, the control system is further configured to assign pattern information according to a date code of an item.

30. The system of claim 17, wherein the control system is further configured to:
   determine replacement pattern information for a returned item if the item was not returned with a pattern information indicator corresponding to pattern information currently associated with items identical to the returned item; and
   associate the replacement pattern information with a product identifier for the returned item.

31. The system of claim 17, further comprising
   a plurality of communication devices;
   wherein, for each of the plurality of communication devices, the control system is configured to send to the communication device picking instructions to locate one or more of the plurality of items to be picked from an inventory area;
   wherein each of the communication devices is configured to:
      receive, from the control system, the picking instructions; and
      present the picking instructions.

32. The system of claim 31, further comprising:
   obtain the determined pattern information associated with the product identification code for each of the one or more items to be picked; and
   present the determined pattern information for each of the one or more items to assist an agent to locate the items based on the presented determined pattern information, wherein the presented pattern information is usable to distinguish the item from other items stored in the inventory area.

33. The system of claim 17, wherein the pattern information comprises a feature extrinsic to the physical appearance of the item.

34. A non-transitory, computer accessible storage medium, storing program instructions executable by one or more computers to cause the one or more computers to perform:
   determining pattern information for each of a plurality of items received at a materials handling facility, the facility comprising a plurality of distinct individual inventory storage areas, wherein a plurality of different types of items are stored together in given ones of the distinct individual inventory storage areas;
   determining other pattern information for another group of the plurality of items, wherein the pattern information comprises a feature that is extrinsic to the physical appearance of the item and that is visually distinguishable, by an agent in the materials handling facility, from the determined pattern information for the other group; and
   associating the respective determined pattern information with a product identifier for each item.

35. The storage medium of claim 34,
   wherein said determining pattern information comprises selecting pattern information for each item; and
   wherein said selecting comprises applying a mathematical function to a product identification code of each item to select the determined pattern information from among a plurality of pattern information.

36. The storage medium of claim 34, wherein the program instructions are further executable by the one or more computers to cause the one or more computers to perform for each of the plurality of items, storing in a database an indication of an association between the respective product identifier, the respective determined pattern information, and one of a plurality of inventory areas in which the respective item is stored, wherein the indication of the association stored in the database is usable in locating one or more of the items from among the plurality of inventory areas.

37. The storage medium of claim 34,
   wherein said determining pattern information for the group of the plurality of items comprises receiving input from an agent indicating pattern information for one of the items;
   wherein the pattern information for the one item is randomly selected by the agent; and
   wherein the randomly selected pattern information is assigned to others of the plurality of items having the same product identifier as the one item.

38. The storage medium of claim 34, wherein the pattern information comprises one or more of: a single color, a single shape, a texture, or a sequence of contrasting shapes.

39. The storage medium of claim 34, wherein said program instructions are further executable by the one or more computers to cause the one or more computers to perform selecting an inventory area for each item from among a plurality of inventory areas, wherein the inventory area is selected independently of the product identifier for the respective item.

40. The storage medium of claim 34, wherein said program instructions are further executable by the one or more computers to cause the one or more computers to perform selecting an inventory area for each item from among a plurality of inventory areas so as to reduce the number of dissimilar items in each inventory area that have the same associated pattern information.

41. The storage medium of claim 34, wherein said program instructions are further executable by the one or more computers to cause the one or more computers to perform selecting an inventory area for each item from among a plurality of inventory areas so as to store only items with different associated pattern information in a single inventory area.

42. The storage medium of claim 34, wherein said program instructions are further executable by the one or more computers to cause the one or more computers to perform selecting an inventory area for each item from among a plurality of inventory areas so as to store two or more items with the same pattern information indicators in a single inventory area only if they are identical items.

43. The storage medium of claim 34, wherein a pattern information indicator is one or more of:
- attached to packaging of the item;
- attached directly to the item;
- attached to a package enclosing the item, wherein the item is a digital video disc and the package is a clamshell-style case;
- permanently attached to the item; or
- temporarily attached to the item.

44. The storage medium of claim 34, wherein said determining comprises assigning identical pattern information to identical items.

45. The storage medium of claim 34, wherein said determining comprises assigning pattern information according to a size or capacity of an item.

46. The storage medium of claim 34, wherein said determining comprises assigning pattern information according to a date code of an item.

47. The storage medium of claim 34, wherein said program instructions are further executable by the one or more computers to cause the one or more computers to perform:
- determining replacement pattern information for a returned item if the item was not returned with a pattern information indicator corresponding to pattern information currently associated with items identical to the returned item; and
- associating the replacement pattern information with a product identifier for the returned item.

48. The storage medium of claim 34, wherein said program instructions are further executable by the one or more computers to cause the one or more computers to perform:
- presenting instructions to locate the item in one of a plurality of inventory areas, and
- presenting pattern information corresponding to the determined pattern information for the item, wherein the presented pattern information represents an indicator applied to the item, and wherein the presented pattern information is usable to distinguish the item from other items stored in the inventory area.

* * * * *